(12) United States Patent
Iida et al.

(10) Patent No.: US 7,673,712 B2
(45) Date of Patent: Mar. 9, 2010

(54) POWER TRANSMISSION SYSTEM FOR WORKING VEHICLE

(75) Inventors: Masaru Iida, Amagasaki (JP); Hideki Kanenobu, Amagasaki (JP); Ryota Ohashi, Amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 563 days.

(21) Appl. No.: 11/519,853

(22) Filed: Sep. 13, 2006

(65) Prior Publication Data

US 2007/0066434 A1 Mar. 22, 2007

(30) Foreign Application Priority Data

Sep. 13, 2005 (JP) ............................. 2005-266091
Sep. 26, 2005 (JP) ............................. 2005-277438

(51) Int. Cl.
B60K 17/28 (2006.01)
B62D 11/02 (2006.01)
F16H 37/00 (2006.01)

(52) U.S. Cl. ...................... 180/53.1; 180/6.48; 74/15.4; 192/18 B

(58) Field of Classification Search ................ 180/6.48, 180/242, 305, 306, 6.3, 53.1; 74/15, 15.4; 192/18 B, 85 AA See application file for complete search history.

(56) References Cited

U.S. PATENT DOCUMENTS 3,561,277 A * 2/1971 Boyle et al ................... 74/15.4
3,715,704 A * 2/1973 Boyle et al. ................... 74/15.4
4,809,796 A * 3/1989 Yamaoka et al. ........... 180/6.48
5,127,215 A 7/1992 Wenzel
5,437,355 A * 8/1995 Takagi et al. ............... 192/18 A
5,560,447 A * 10/1996 Ishii et al. .................... 180/242
6,126,564 A * 10/2000 Irikura et al. .................. 475/24
6,382,339 B1 * 5/2002 Nemoto ....................... 180/248
6,854,541 B2 * 2/2005 Matufuji et al. ............. 180/53.1
7,299,888 B2 * 11/2007 Ohashi et al. ............... 180/53.6
7,448,485 B1 * 11/2008 Rutler ......................... 194/214
2007/0209457 A1 * 9/2007 Irikura et al. ................. 74/15.8

* cited by examiner

Primary Examiner—Tony H. Winner
(74) Attorney, Agent, or Firm—Sterne, Kessler, Goldstein & Fox P.L.L.C.

(57) ABSTRACT

A power transmission system for a working vehicle comprises: a vehicle frame; a prime mover mounted on the vehicle frame; a pair of left and right drive wheels; a pair of left and right transaxles juxtaposed on the vehicle frame, wherein each of the left and right transaxles includes a single axle for individually driving each of the left and right drive wheels in forward and rearward directions; a working device; and a working power clutch unit disposed between the left and right transaxles so as to clutch on/off power transmitted from the prime mover to the working device. The working power clutch unit includes: a driving side rotary mechanism for receiving power from the prime mover; the driving side rotary mechanism having one or more first rotors interlocking with each other; a driven side rotary mechanism for outputting power to the working device, the driven side rotary mechanism having one or more second rotors interlocking with each other; and a hydraulic clutch drivingly interposed between the driving side rotary mechanism and the driven side rotary mechanism, and incorporated in the working power clutch unit.

19 Claims, 27 Drawing Sheets

Fig. 11 ated in the working power clutch unit.
POWER TRANSMISSION SYSTEM FOR WORKING VEHICLE

BACKGROUND OF THE INVENTION

1. Field of the Invention

The invention relates to a power transmission system for a working vehicle, provided with left and right independent transaxles individually driving respective left and right drive wheels of the vehicle, and with a working power clutch unit incorporating a clutch for clutching on/off the power transmitted to a working device equipped on the vehicle.

2. Related Art

As disclosed in U.S. Pat. No. 5,127,215, there is a conventional well-known hydraulically driven working vehicle equipped with left and right independent hydraulic transaxles for individually driving respective left and right drive wheels. This type of vehicle is advantageously compact while ensuring a large space for a working device, and can turn in a small circle.

This conventional vehicle uses an electromagnetic actuating clutch interposed between a prime mover and the working device. Generally, a maker of hydraulic transaxles is different from a maker of electromagnetic actuating clutches. Consequently, a vehicle maker, when assembling vehicles, must onerously call the maker of electromagnetic clutches for a supply of electromagnetic clutches selected corresponding to target hydraulic transaxles.

SUMMARY OF THE INVENTION

An object of the invention is to provide a power transmission system for a working vehicle, whereby a clutch unit for a working device equipped on the vehicle is supplied together with transaxles for individually driving drive wheels so that a vehicle maker can easily assemble the clutch unit together with the transaxles or can get the clutch unit having been pre-assembled with the transaxles.

To achieve the first object of the invention, a power transmission system for a working vehicle according to the invention comprises: a vehicle frame; a prime mover mounted on the vehicle frame; a pair of left and right drive wheels; a pair of left and right transaxles juxtaposed on the vehicle frame; a working device; and a working power clutch unit disposed between the left and right transaxles so as to clutch the power transmitted from the prime mover to the working device on or off. Each of the left and right transaxles includes a single axle for individually driving each of the left and right drive wheels in forward and rearward directions. The working power clutch unit includes a driving side rotary mechanism for receiving power from the prime mover, a driven side rotary mechanism for outputting power to the working device, and a hydraulic clutch. The driving side rotary mechanism includes one or more first rotors interlocking with each other. The driven side rotary mechanism includes one or more second rotors interlocking with each other. The hydraulic clutch is drivingly interposed between the driving side rotary mechanism and the driven side rotary mechanism, and is incorporated in the working power clutch unit.

When the transaxles are hydraulic transaxles, the hydraulic clutch of the working power clutch unit can be hydraulically actuated together with the transaxles so that the working power clutch unit can be easily assembled together with the transaxles. Consequently, a vehicle maker can easily and economically finish a working vehicle with the power transmission system.

Preferably, the working power clutch unit is integrally connected to the left and right transaxles. Therefore, the power transmission system can eliminate the labor previously needed to connect the working power clutch unit to the transaxles.

Further preferably, a connection frame connects the left and right transaxles to each other, and the working power clutch unit is supported by the connection frame. Thus the connection frame is disposed between the transaxles so as to correspond to the lateral width of the working vehicle.

Preferably, the left and right transaxles receive power from the prime mover through the driving side rotary mechanism of the working power clutch unit. Therefore, a transmission maker can produce the power transmission system including the left and right transaxles and the working power clutch unit drivingly connected to the left and right transaxles, so that a vehicle maker can easily equip the power transmission system onto a working vehicle.

Further preferably, a belt type transmission is interposed between the driving side rotary mechanism of the working power clutch unit and the pair of left and right transaxles. Therefore, when the left and right transaxles and the driving side rotary mechanism include respective input shafts disposed in parallel, the belt type transmission drivingly connects the parallel input shafts to one another and enhances the freedom degree of layout of the transaxles and the working power clutch unit.

Alternatively, preferably, the left and right transaxles receive power from the prime mover, which is not transmitted through the driving side rotary mechanism of the working power clutch unit. Therefore, the power transmission system reduces power loss.

Further preferably, a belt type transmission is interposed between the prime mover and the pair of left and right transaxles. Therefore, when the left and right transaxles and the driving side rotary mechanism include respective input shafts disposed in parallel, the belt type transmission drivingly connects the parallel input shafts to one another and enhances the freedom degree of layout of the transaxles relative to the prime mover.

Preferably, a rotary axis of the foremost first rotor receiving power from the prime mover is not coaxial but parallel to a rotary axis of the last second rotor outputting power to the working device. Therefore, the last second rotor (such as a PTO shaft) can be placed optimally corresponding to the working device or a PTO power transmission device. For example, it is assumed that the working power clutch unit is provided on a rear portion of a vehicle, a vertically movable mower unit serving as a working device is provided on a fore-and-aft intermediate portion of the vehicle, and a transmission belt is interposed between the working power clutch unit and the mower unit. When the PTO shaft serving as the last second rotor is disposed rearward from an input shaft of the working power clutch unit serving as the foremost first rotor, a distance of an input shaft of the mower unit from the PTO shaft becomes large so as to reduce a slant angle of the transmission belt when the mower unit is raised.

Further preferably, the driving side rotary mechanism includes a gear train including gears serving as the first rotors whose rotary axes are not coaxial to each other. Therefore, the driving side rotary mechanism has a small power loss and an excellent durability depending on the gear train, thereby ensuring that the foremost first rotor receiving power from the prime mover is not coaxial but parallel to the last first rotor outputting power to the hydraulic clutch, and thereby ensuring that the foremost first rotor is not coaxial but parallel to the last second rotor outputting power to the working device.

Further preferably, the gear train includes an idle gear. Due to the idle gear, the rotary direction of the driven side rotary mechanism relative to the rotary direction of the prime mover is selectable corresponding to an input rotary direction of the working device.

Alternatively, preferably, all of the first rotors and all of the second rotors are coaxial to each other. Therefore, the working power clutch unit is minimized so as to minimize a working vehicle equipped with the power transmission system.

Preferably, at least one of the left and right transaxles includes a hydraulic pressure source for the hydraulic clutch. Therefore, the working power clutch unit includes no additional hydraulic pressure source for the hydraulic clutch, thereby being minimized and simplified.

Alternatively, preferably, the working power clutch unit includes a hydraulic pressure source for the hydraulic clutch. Therefore, the hydraulic pressure sources of the left and right transaxles can be used for a hydraulic device other than the hydraulic clutch of the working power clutch unit.

Further, no pipe is required for supplying hydraulic pressure from the transaxle or transaxles to the power device clutch apparatus, thereby facilitating disposition of the power transmission system in a narrow space.

Preferably, a delay valve is disposed on a fluid supply passage to the hydraulic clutch so as to moderate the clutching action of the hydraulic clutch.

Therefore, the hydraulic clutch and the working device become advantageously durable.

Preferably, a reservoir tank is disposed in the working power clutch unit, and each of the working power clutch unit and the left and right transaxles includes an individual fluid sump fluidly connected to the reservoir tank. Due to the reservoir tank disposed in the working power clutch unit and shared among the working power clutch unit and the transaxles, no additional reservoir tank is required and the power transmission system becomes simple, small and economic.

Preferably, a cooling fan is rotatably integral with the first rotor.

Therefore, the power transmission system requires no additional device for driving a cooling fan, thereby being simple, small and economic.

Preferably, a transmission is interposed between the prime mover and the driving side rotary mechanism. The transmission, such as a belt type transmission, ensures a large freedom degree of layout of the working power clutch unit and the transaxles relative to the prime mover so as to increase variety in design of working vehicles.

Alternatively, preferably, the prime mover includes an output shaft directly connected to the driving side rotary mechanism. Therefore, a power loss between the prime mover and the working power clutch unit is reduced, and a space required for the prime mover and the power transmission system is reduced so as to minimize a working vehicle equipped with the power transmission.

Preferably, a brake mechanism is disposed on the downstream side of the hydraulic clutch so as to brake the driven side rotary mechanism when the hydraulic clutch is clutched off. Therefore, an inertial driving of the working device (e.g., an inertial rotation of a rotary blade of a mower unit) is swiftly stopped and the stationary working device is safely locked.

These, further and other objects, features and advantages will appear more fully from the following description with reference to the accompanying drawings.

BRIEF DESCRIPTION OF THE DRAWINGS

FIG. 11 is a hydraulic circuit diagram of the working vehicle according to the second embodiment.

DETAILED DESCRIPTION OF THE INVENTION

Figure 1:
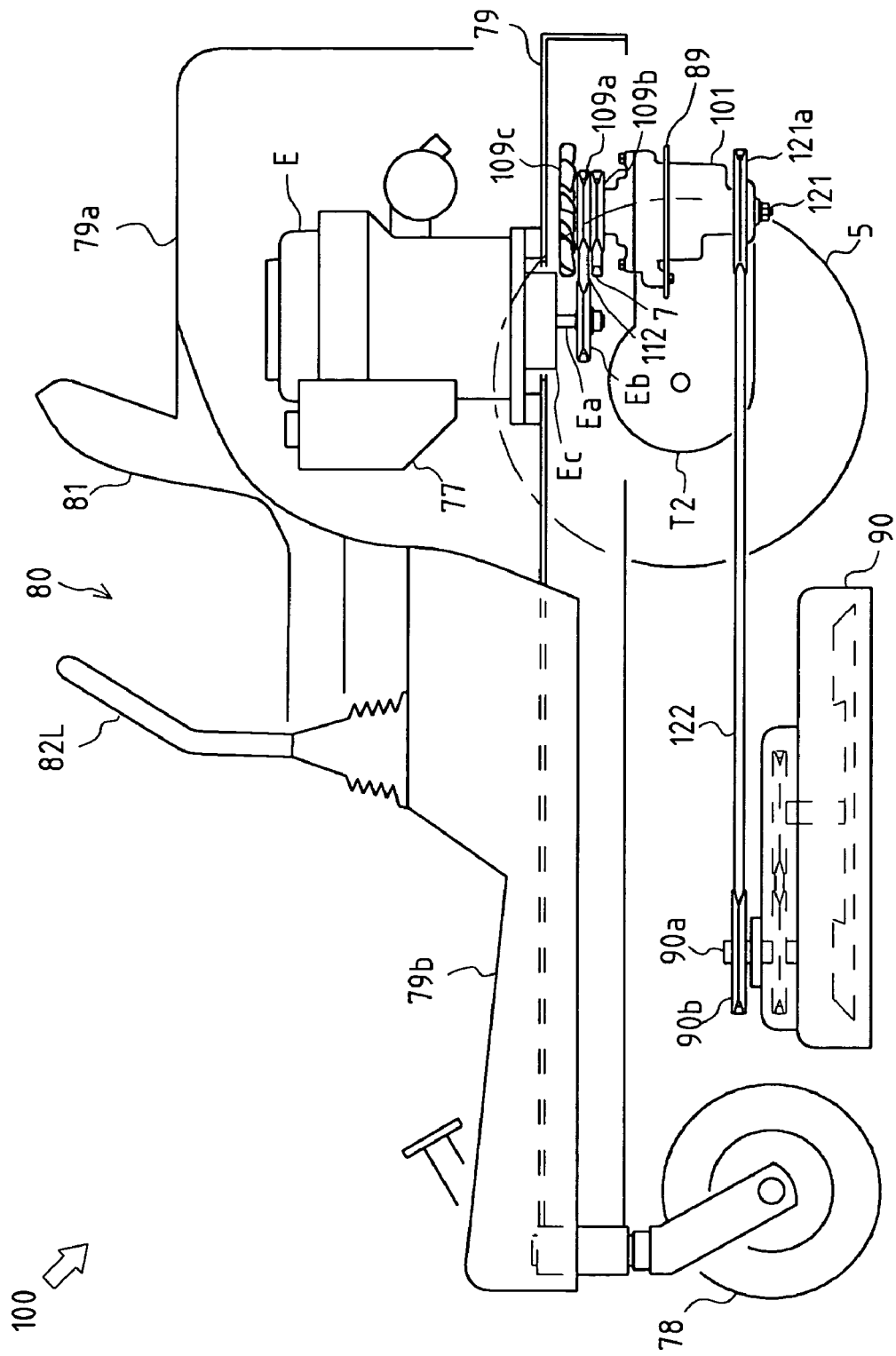
FIG. 1 is a sectional side view partly in section of a working vehicle according to a first embodiment.

Referring to FIGS. 1 to 9, a working vehicle (riding lawn mower) 100 with a power transmission system according to a first embodiment, will be described.

A general structure of working vehicle 100 will be described with reference to FIGS. 1, 2, 6 and 7. Working vehicle 100 includes a vehicle frame 79 extended in the fore-and-aft direction thereof. An engine E, serving as a prime mover, is secured on a rear portion of vehicle frame 79. A fuel tank 77 is integrally provided on a front surface of engine E. Engine E includes a vertical crankshaft projecting downward so as to be provided thereon with a flywheel Ec. An engine output shaft Ea is substantially coaxially connected to the crankshaft through a damper, extended downward from flywheel Ec, and fixedly provided on a bottom end thereof with an output pulley Eb.

Left and right (rear) drive wheels 5 are disposed on left and right outsides of vehicle frame 79. Left and right transaxles T1 and T2 are fixed onto respective inside surfaces of left and right side plates of vehicle frame 79. Each of left and right transaxles T1 and T2 includes a single axle 4 for driving each of left and right drive wheels 5, so that the pair of transaxles T1 and T2 individually (differentially) rotate respective drive wheels 5 in forward and rearward directions.

Each of transaxles T1 and T2 includes a housing 1, from which an input shaft 6 is extended upward. In each of transaxles T1 and T2, input shaft 6 is disposed perpendicular to axle 4. Input shafts 6 are disposed in parallel to engine output shaft Ea, i.e., vertically, so as to be drivingly connected to engine output shaft Ea through a later-discussed belt type transmission. In this regard, pulleys 6a are fixed on respective tops of input shafts 6.

A pair of front and rear connection frames 88 and 89, which are horizontal flat plates, are disposed between left and right transaxles T1 and T2 and fixed at left and right ends thereof onto mutually facing proximal end portions of housings 1 of transaxles T1 and T2. Left and right axles 4 are laterally distally extended from lateral outsides of respective housings 1 of transaxles T1 and T2, opposite to each other. Consequently, left and right transaxles T1 and T2 are integrated so as to have respective axles 4 disposed coaxially to each other. Further, a later-discussed working power clutch unit 101 is fixedly supported on rear connection frame 89. In this way, left and right transaxles T1 and T2 and working power clutch unit 101 are assembled together through connection frames 88 and 89, thereby serving as an integral power transmission system, which can be easily mounted on vehicle frame 79.

Alternatively, only one of connection frames 88 and 89 may be enough to integrally connect transaxles T1 and T2 to each other.

Working power clutch unit 101 includes a housing 104 from which a vertical input shaft 109 is extended upward so as to be disposed in parallel to input shafts 6 of transaxles T1 and T2. An input pulley 109a is fixed on a top of input shaft 109. A belt 112 is looped over input pulley 109a and engine output pulley Eb, so as to transmit power from engine E to input shaft 109 drivingly connected to a driving side of a hydraulic clutch 120 disposed in housing 104.

A pulley 109b is fixed on input shaft 109 below input pulley 109a. A belt 7 is looped over pulley 109b and pulleys 6a of left and right transaxles T1 and T2, so as to transmit the rotation of input shaft 109 of working power clutch unit 101 driven by engine E to input shafts 6 of left and right transaxles T1 and T2. Belts 112 and 7 may be tensed by tension pulleys, and the tension pulleys may be tension clutches.

A cooling fan 109c is rotatably integrally fitted on a top of input shaft 109 so as to blow a downward cooling air onto working power clutch unit 101 and instruments surrounding working power clutch unit 101.

Working power clutch unit 101 includes hydraulic clutch (i.e., hydraulic actuating clutch) 120 disposed in housing 104, and input shaft 109 serves as a driving shaft of clutch 120. An output shaft of clutch 120 is disposed coaxially to input shaft 109, and extended vertically downward from a bottom end of housing 104 so as to serve as a PTO shaft 121. An upper expanded portion of housing 104 enclosing hydraulic clutch 120 (serving as a later-discussed clutch chamber 102) is vertically passed through connection frame 89 and projects downward from connection frame 89. In this way, hydraulic clutch 120 is drivingly interposed between input shaft 109 (a first rotor) and PTO shaft 121 (a second rotor). An output pulley 121a is fixed on a bottom end of PTO shaft 121.

As shown in FIG. 1, a rear cover 79a is mounted upward on a rear portion of vehicle frame 79 so as to enclose engine E. A driver's section 80 including a driver's seat 81 is disposed on rear cover 79a at a fore-and-aft middle portion of vehicle frame 79. A front cover 79b is spread over a front portion of vehicle frame 79 forward from driver's section 80, so as to serve as a footboard for a driver sitting on seat 81.

In driver's section 80, left and right control levers 82L and 82R are disposed on left and right outsides of seat 81, and operatively connected to output control devices (i.e., movable swash plates 8 of hydraulic pumps P) of respective transaxles T1 and T2 through wires or the like. An operator sitting on seat 81 operates (i.e., pushes forward or pulls rearward) each of control levers 82L and 82R with his or her corresponding left or right hand, so as to individually control the left and right output control devices.

Driver's section 80 includes an operation device (not shown) for switching hydraulic clutch 120, e.g., an electric switch with an operation button, or a foot pedal.

Working vehicle 100 is provided with one or more front wheels 78, which are casters horizontally rotatably fitted to a front end portion of vehicle frame 79.

Working vehicle 100 is provided with a mower unit 90 serving as a working device disposed below vehicle frame 79 between front wheels 78 and rear drive wheels 5. A lift mechanism (not shown) vertically movably suspends mower unit 90 from vehicle frame 79. Mover unit 90 includes a vertically mover input shaft 90a which is extended upward and fixedly provided thereon with a mower input pulley 90b. A belt 122 is looped over mower input pulley 90b and output pulley 121a on PTO shaft 121, so as to transmit power of engine E outputted from working power clutch unit 101 to rotary blades of mower unit 90. Any working device other than mower unit 90 may be equipped on working vehicle 100 so as to receive power from working power clutch unit 101.

As mentioned above, in working vehicle 100, power of engine E is transmitted through working power clutch unit 101, and distributed between transaxles T1 and T2 and the working device such as mower unit 90.

Figure 5:
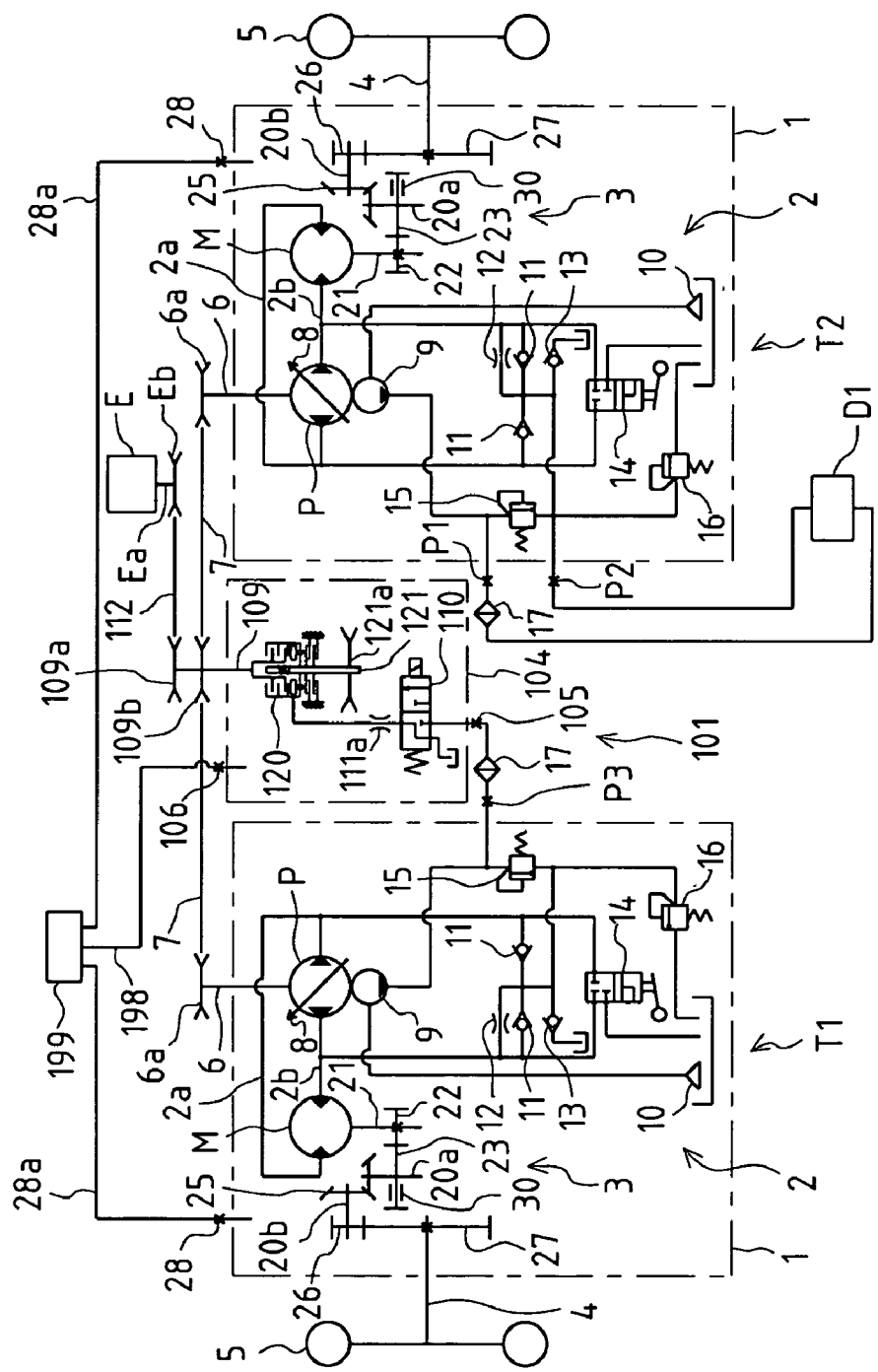
FIG. 5 is a hydraulic circuit diagram of the working vehicle according to the first embodiment.

Referring to FIG. 5, a hydraulic circuit system of working vehicle 100 will be described. A hydraulic driving structure of transaxles T1 and T2 will firstly be described. Generally, each of transaxles T1 and T2 includes housing 1 incorporating an HST (hydrostatic stepless transmission) 2, a deceleration gear train 3 and axle 4. HST 2 includes a variable displacement hydraulic pump P and a fixed displacement hydraulic motor M which are fluidly connected to each other through a pair of fluid passages 2a and 2b so as to constitute a closed fluid circuit. Deceleration gear train 3 is drivingly interposed between hydraulic motor M and axle 4. Left transaxle T1 includes axle 4 projecting leftward from corresponding housing 1, right transaxle T2 includes axle 4 projecting rightward from housing 1, and drive wheels 5 are fixed on distal ends of respective axles 4.

Input shafts 6 serve as pump shafts of respective hydraulic pumps P of transaxles T1 and T2. Input shafts 6 project vertically upward (in parallel to each other) from respective housings 1, and are driven by engine E through belts 112 and 7 as mentioned above, thereby synchronously driving both hydraulic pumps P with power from common engine E.

In each housing 1, HST 2 is provided with a charge pump 9 driven together with hydraulic pump P by the rotation of input shaft (pump shaft) 6.

Charge pump 9 of each of transaxles T1 and T2 absorbs fluid from a fluid sump in corresponding housing 1 through a fluid filter 10, and delivers fluid through a pair of charge check valves 11 to the closed fluid circuit of corresponding HST 2. More specifically, charge pump 9 supplies fluid to depressed one of fluid passages 2a and 2b through corresponding charge check valve 11.

Figure 6:
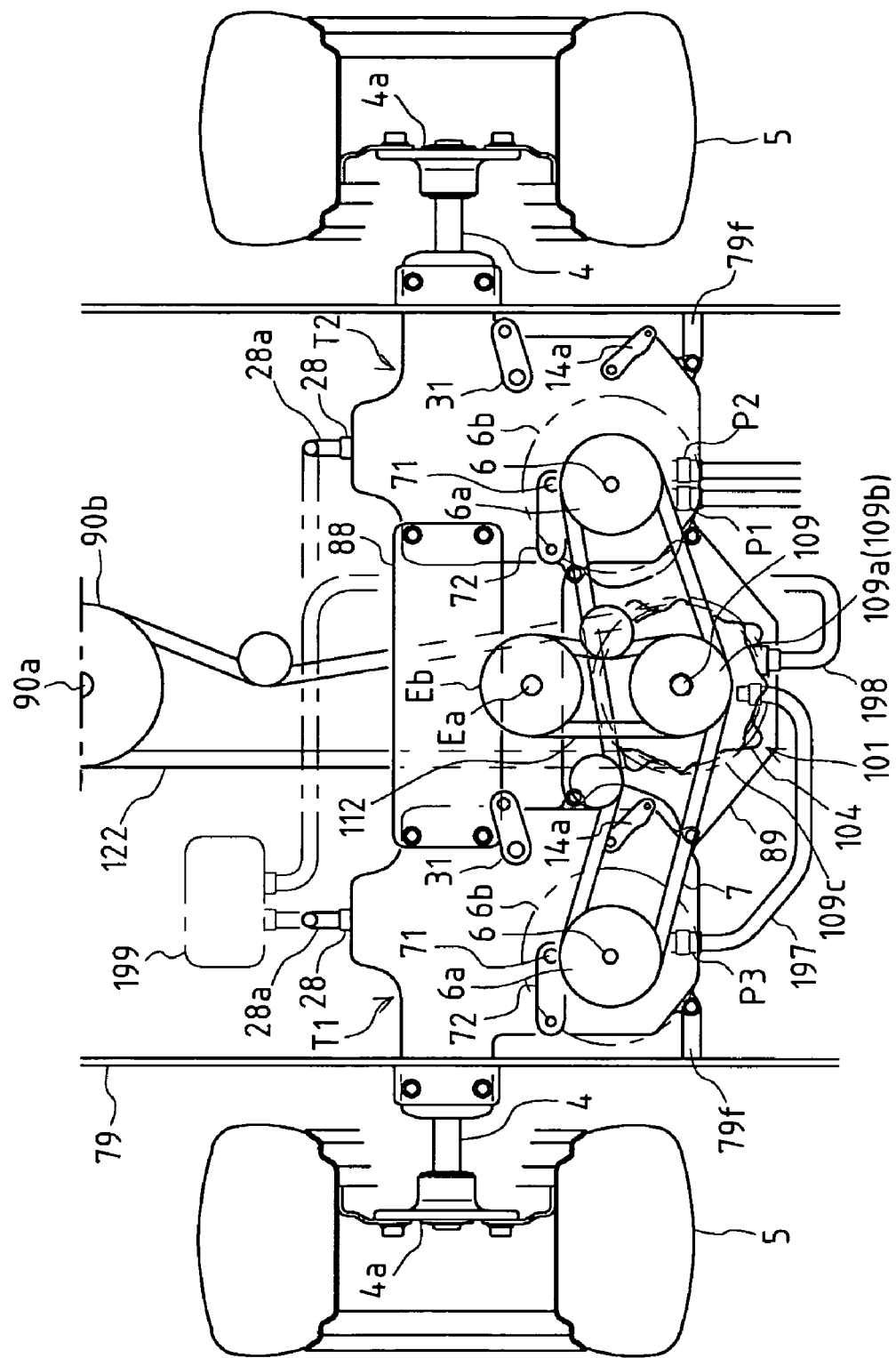
FIG. 6 is a plan view of a power transmission system of the working vehicle according to the first embodiment.
Figure 7:
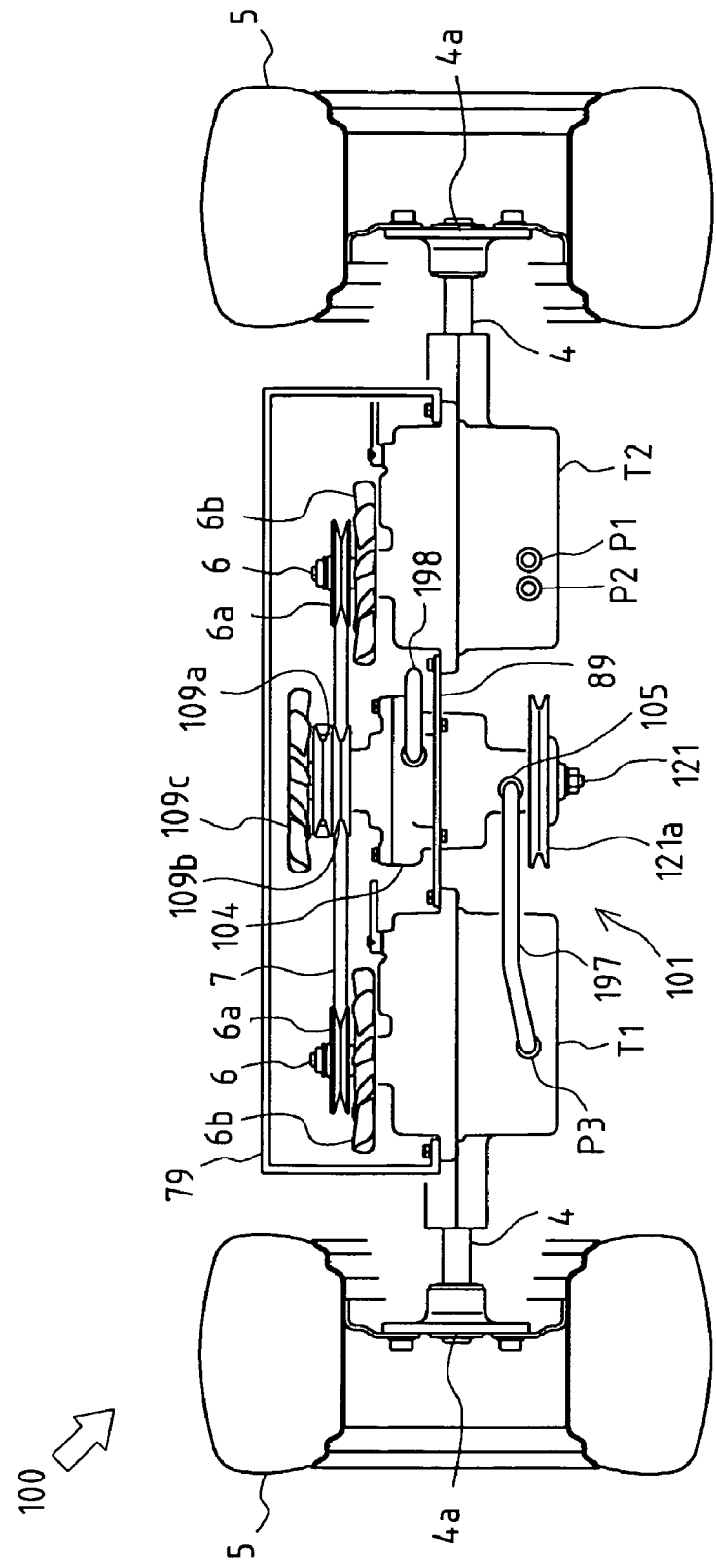
FIG. 7 is a rear view of the power transmission system of FIG. 6.

A part of fluid delivered from charge pump 9 of one of transaxles T1 and T2 (in this embodiment, left transaxle T1) is branched out from an upstream side of charge check valves 11, and extracted from housing 1 through a hydraulic pressure extraction port P3, so as to be supplied as clutch pressure fluid to hydraulic clutch 120 in working power clutch unit 101 through a pipe 197 (see FIGS. 6 and 7). In this way, charge pump 9 in transaxle T1 serves as a hydraulic pressure source for hydraulic clutch 120.

A part of fluid delivered from charge pump 9 of right transaxle T2 is extracted from housing 1 through a hydraulic pressure extraction port P1, so as to be supplied to an external hydraulic actuating implement D1 (e.g., a hydraulic actuator for moving the above-mentioned lift mechanism of mower unit 90, or a hydraulic clutch of a working device), and returned into housing 1 of right transaxle T2 through a hydraulic pressure returning port P2, so as to be supplied to the closed fluid circuit of HST 2 of right transaxle T2 through charge check valves 11. Pipes are extended from ports P1 and P2 of transaxle T2 and connected to external hydraulic actuating implement D1. A line filter 17 is provided for filtering fluid extracted from each of hydraulic pressure extraction ports P1 and P3. Line filter 17 may be provided in a pipe joint serving as each of ports P1 and P3.

An implement relief valve 15 is provided in each housing 1 so as to regulate hydraulic pressure of fluid extracted to each of hydraulic clutch 120 and external hydraulic actuating implement D1. Fluid released from implement relief valve 15 of transaxle T2 is combined with the fluid returned into housing 1 of transaxle T2 through hydraulic pressure returning port P2. A charge relief valve 16 is provided in each housing 1 so as to regulate hydraulic pressure of fluid having passed through implement relief valve 15 (with fluid returned from port P2, in the case of transaxle T2) before the fluid is supplied through charge check valves 11 to the closed fluid circuit of HST 2. Fluid released from charge relief valve 16 is drained into the fluid sump in corresponding housing 1.

In each housing 1, fluid passage 2b is pressurized higher than fluid passage 2a when swash plate 8 of hydraulic pump P is set for backward rotating corresponding axle 4. An orifice 12 is fluidly connected to fluid passage 2b in parallel to charge check valve 11 for supplying fluid to fluid passage 2b. When movable swash plate 8 is disposed for backward rotating axle 4, orifice 12 bypasses fluid from higher-pressurized fluid passage 2b to the upstream side of charge check valves 11. Due to orifice 12, when movable swash plate 8 is placed at a small displacement (for a low speed of axle 4) position (adjacent to a neutral position) in the movable range thereof for backward rotating axle 4, hydraulic pressure in fluid passage 2b becomes less than a value required to rotate corresponding hydraulic motor M, thereby stopping vehicle 100.

Namely, due to orifice 12, hydraulic pump P has a neutral zone expanded into an essentially small displacement range thereof for backward rotating axle 4.

Further, in each housing 1, a free wheel prevention fluid passage including a check valve 13 is extended from the upstream side of charge check valves 11 to the fluid sump in housing 1. When hydraulic pressure in fluid passages 2a and 2b becomes insufficient while engine E is stationary, check valve 13 is opened to absorb fluid from the fluid sump into the closed fluid circuit of HST 2, thereby constantly supplying the closed fluid circuit of HST 2 with sufficient fluid. Therefore, hydraulic motor M is prevented from being unexpectedly rotated following rotation of wheels 5 by the gravity when working vehicle 100 is parked on a slope.

Further, in each housing 1, a bypass valve 14 is provided for allowing hydraulic motor M to rotate following rotation of wheels 5, i.e., to act as a pump, when vehicle 100 is hauled. Bypass valve 14 is normally closed, and manually opened at need so as to drain fluid from fluid passages 2a and 2b of HST 2 to the fluid sump in housing 1.

In HST 2 of each of transaxles T1 and T2, hydraulic pump P driven by engine E delivers fluid so as to drive hydraulic motor M. The tilt angle and direction of movable swash plate 8 of each hydraulic pump P is controlled so as to control the rotary speed and direction of corresponding hydraulic motor M (motor shaft 21). When control levers 82L and 82R are synchronously operated so as to set both movable swash plates 8 to the same tilt angle and direction, axles 4 of transaxles T1 and T2 rotate at the same speed and in the same direction, whereby working vehicle 100 travels straight forward or backward. When control levers 82L and 82R are differentially operated so as to set movable swash plates 8 to different positions, axles 4 of transaxles T1 and T2 differentially rotate (i.e., rotate at different speeds or in opposite directions) so that working vehicle 100 turns left or right.

Left and right transaxles T1 and T2 will now be described. Transaxles T1 and T2 are substantially the same except for their different hydraulic circuit structures for driving respective external implements (above-mentioned hydraulic clutch 120 and hydraulic actuating implement D1) and for respective axles 4 extended opposite to each other. Hereinafter, description of transaxles T1 and T2 is based on the assumption that axles 4 are disposed laterally horizontally in front of respective HSTs 2 in which pump shafts 6 and motor shafts 21 are disposed vertically.

Figure 3:
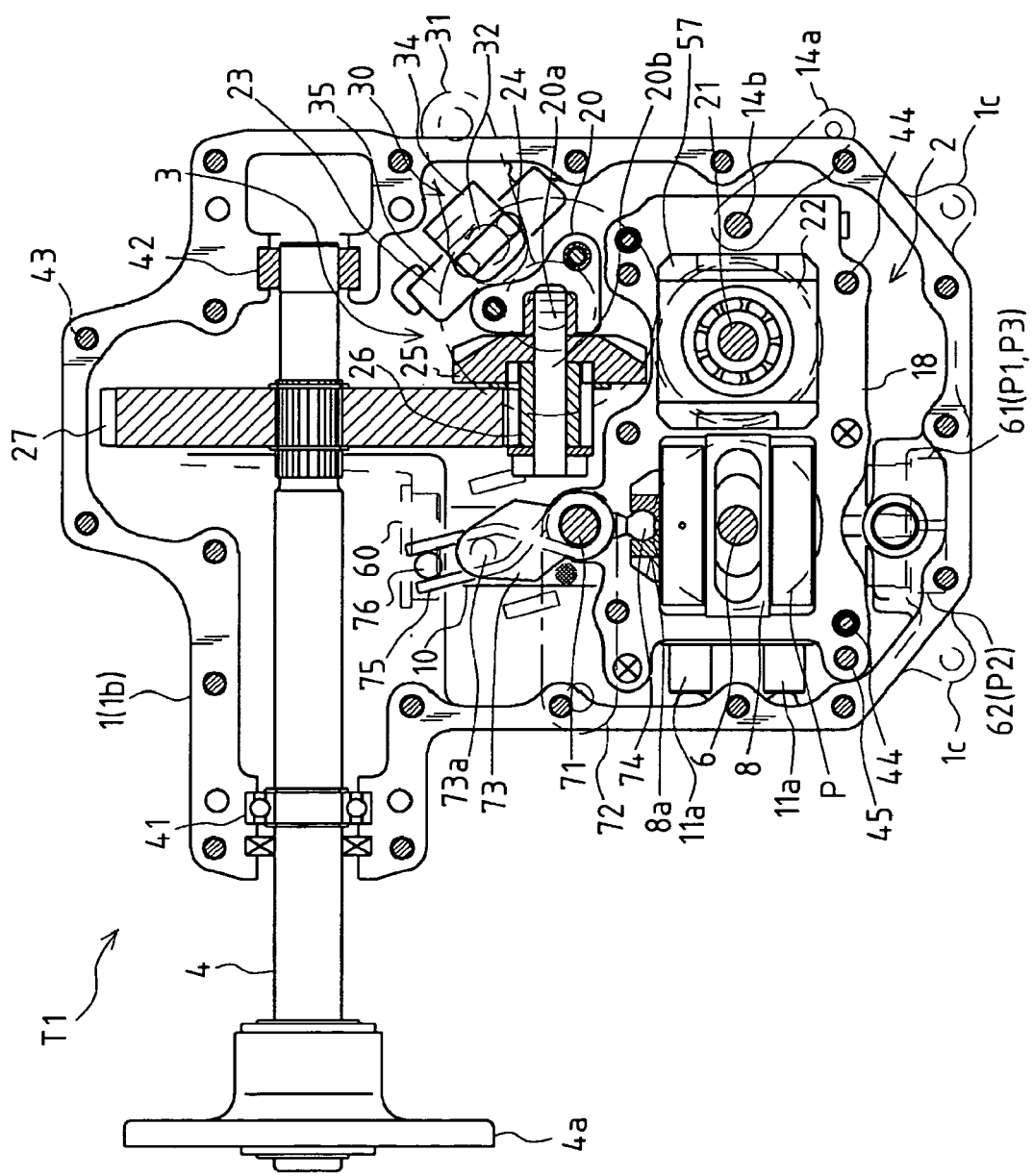
FIG. 3 is a plan view of a left transaxle from which an upper housing half is removed.
Figure 4:
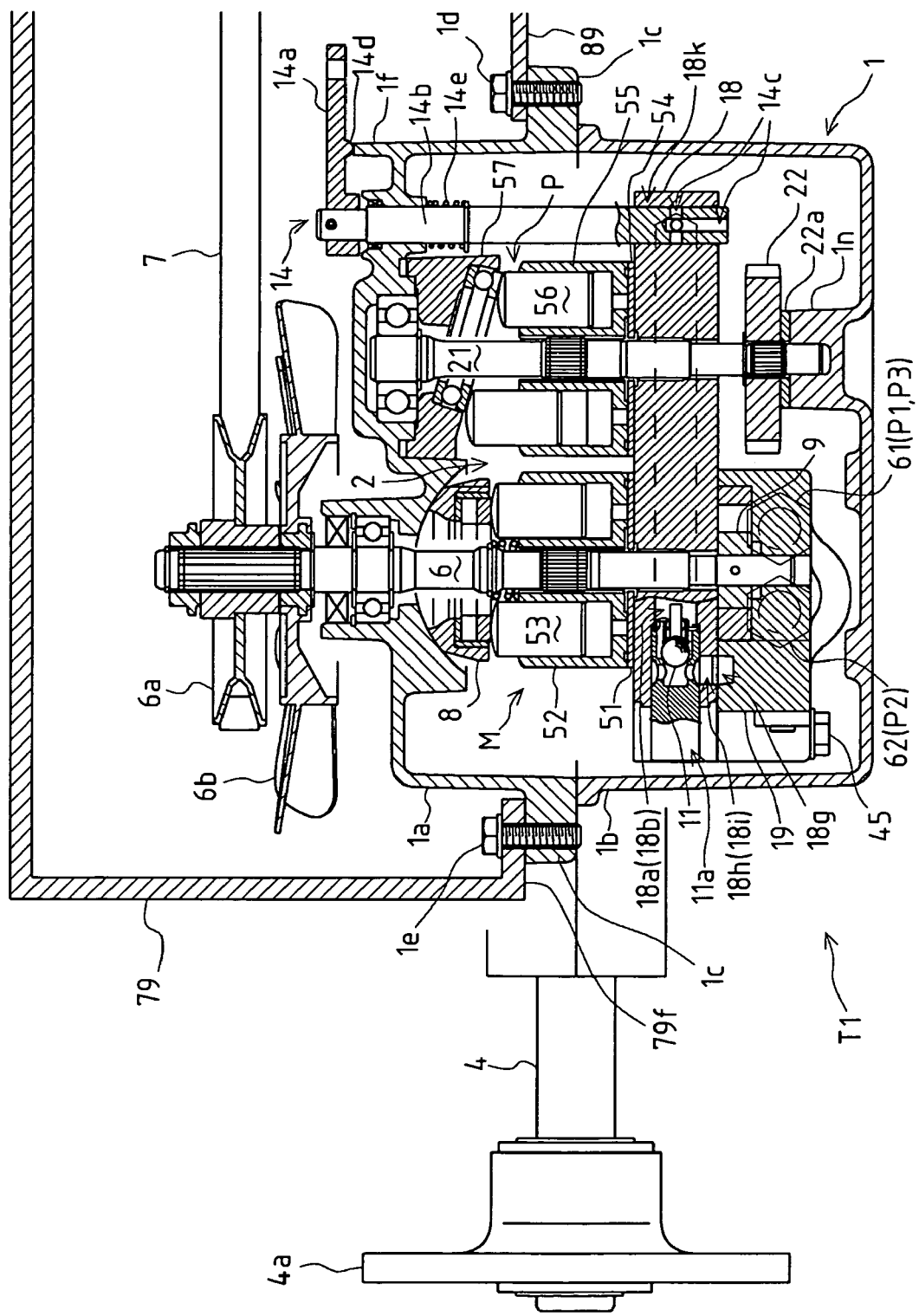
FIG. 4 is a sectional rear view of the left transaxle.

Referring to left transaxle T1 shown in FIGS. 3 and 4, an upper housing half 1a and a lower housing half 1b are joined to each other through a horizontal joint surface, and surrounding walls of upper and lower housing halves 1a and 1b are fastened to each other by vertical bolts 43, thereby constituting housing 1. An axis of axle 4 is disposed on the horizontal joint surface between upper and lower housing halves 1a and 1b, so that axle 4 is clamped between housing halves 1a and 1b through left and right bearings 41 and 42. A final gear 27 is fixed on axle 4 between bearings 41 and 42 in housing 1. A flange 4a is fixed on the distal end of axle 4 outside housing 1, and drive wheel 5 is attached on flange 4a.

With respect to each of left and right transaxles T1 and T2, upper housing half 1a is formed at a rear portion thereof with left and right bosses 1c. Rear connection frame 89 is fastened at a left end portion thereof onto right boss 1c of left transaxle T1 by a bolt 1d, and at a right end portion thereof onto left boss 1c of right transaxle T2 by a bolt 1d (FIG. 4 shows only the case of left transaxle T1). As shown in FIG. 6, a front edge of rear connection frame 89 is also fastened at left and right ends thereof onto other bosses formed on housings 1 of left and right transaxles T1 and T2. Further, front connection frame 88 is fastened at a left end thereof onto a right end portion of upper housing half 1a of left transaxle T1 by bolts, and at a right end thereof onto a left end portion of upper housing half 1a of right transaxle T2 by bolts, as shown in FIG. 6. Consequently, left and right transaxles T1 and T2 are firmly integral together with front and rear connection frames 88 and 89 and with working power clutch unit 101 supported by rear connection frame 89 between transaxles T1 and T2.

The left and right side plates of vehicle frame 79 are formed at bottom ends thereof with respective stays 79f extended laterally proximally so as to face each other. Left boss 1c of left transaxle T1 is fastened onto left stay 79f by a bolt 1e, and right boss 1c of right transaxle T2 is fastened onto right stay 79f by a bolt 1e (FIG. 4 shows only the case of left transaxle T1). Further, a laterally distally extended front portion of upper housing half 1a of each of transaxles T1 and T2 for holding axle 4 is fastened at a top surface thereof to each of the left and right side plates of vehicle frame 79 by bolts.

In this way, transaxles T1 and T2 integrated with working power clutch unit 101 through connection frames 88 and 89 are secured to vehicle frame 79.

HST 2 of each of transaxles T1 and T2 will be described. A center section 18 formed like a horizontal flat plate is submerged in the fluid sump in housing 1 (lower housing half 1b). A charge pump housing 19 is joined at a top surface thereof to a bottom surface of center section 18 in the fluid sump. A support wall (not shown) is extended downward from a ceiling of upper housing half 1a, and its bottom end contacts a top surface of center section 18.

Vertical bolts 44 (see FIG. 3) are screwed upward so as to fasten center section 18 to the support wall. Further, vertical bolts 45 are screwed upward so as to fasten charge pump casing 19 and center section 18 to the support wall.

As shown in FIG. 4, in center section 18, front and rear parallel horizontal fluid holes 18a and 18b are bored and extended laterally (parallel to axle 4) so that fluid hole 18a serves as fluid passage 2a, and fluid hole 18b serves as fluid passage 2b. As shown in FIGS. 3 and 4, center section 18 is formed on the top surface thereof with a pump mounting surface and a motor mounting surface. A pair of kidney ports are opened at each of the pump mounting surface and the motor mounting surface so as to be opened to respective fluid holes 18a and 18b. The pump mounting surface and the motor mounting surface are laterally juxtaposed (in this embodiment, the pump mounting surface is right, and the motor mounting surface is right). A cylinder block 52 of hydraulic pump P is slidably rotatably fitted through a valve plate 51 onto the pump mounting surface. A cylinder block 55 of hydraulic motor M is slidably rotatably fitted through a valve plate 54 onto the motor mounting surface.

As shown in FIGS. 3 and 4, pistons 53 are vertically reciprocally fitted into cylinder block 52, and pressed at top ends thereof against cradle type movable swash plate 8 slidably fitted onto a sectionally arcuate surface formed at the ceiling of upper housing half 1a. Pistons 56 are vertically reciprocally fitted into cylinder block 55, and pressed at top ends thereof against a fixed swash plate 57 fixedly supported by the ceiling of upper housing half 1a.

As shown in FIG. 4, vertical motor shaft 21 relatively unrotatably engage with cylinder block 55. Motor shaft 21 axially penetrates cylinder block 55, and is extended upward through fixed swash plate 57 so as to be journalled at a top end thereof by the ceiling of upper housing half 1a through a bearing.

Further, motor shaft 21 is extended downward from cylinder block 55, relatively rotatably penetrates valve plate 54 and center section 18, and projects downward from center section 18 so as to be fixedly provided thereon with a motor output gear 22 which is drivingly connected to axle 4 through deceleration gear train 3. Motor shaft 21 is journalled at a bottom end thereof by an upward projecting bearing wall 1n formed on the bottom portion of lower housing half 1b. A washer 22a is fitted around pump shaft 21 between a bottom surface of motor output gear 22 and a top surface of bearing wall 1n.

As shown in FIGS. 3 and 4, vertical pump shaft 6 relatively unrotatably engage with cylinder block 52. Pump shaft 6 axially penetrates cylinder block 52, and is extended upward through movable swash plate 8 so as to be journalled by the ceiling of upper housing half 1a through a bearing. Further, pump shaft 6 is extended upward from upper housing half 1a so as to be fixedly provided thereon with input pulley 6a and a cooling fan 6b.

Pump shaft 6 is extended downward from cylinder block 52, relatively rotatably penetrates valve plate 51 and center section 18, and projects downward from center section 18 so as to be journalled by charge pump housing 19.

As shown in FIG. 4, charge pump housing 19 incorporates trochoidal charge pump 9 including inner and outer rotors. The downward extended portion of pump shaft 6 serves as a drive shaft for charge pump 9. The inner rotor is fixed on the lower portion of pump shaft 6 projecting downward from center section 18. Fluid filter 10, shown in FIG. 5, is disposed in housing 1 so that charge pump 9 absorbs fluid from the fluid sump in housing 1 through fluid filter 10.

As shown in FIGS. 3 and 4, left and right pipe joints 61 and 62 are fitted at front ends thereof into a rear end portion of charge pump housing 19, and project rearward from lower housing half 1b so as to be connected to an external hydraulic actuating implement through respective pipes (hoses). Pipe joint 61, serving as either hydraulic pressure extraction port P1 or P3 shown in FIG. 5, is opened to a delivery port of charge pump 9 in charge pump housing 19 so as to supply fluid from charge pump 9 to the external hydraulic actuating implement (D1 or working power clutch unit 101 including hydraulic clutch 120) through the pipe. Pipe joint 62, serving as hydraulic pressure returning port P2 shown in FIG. 5, is opened to a charge fluid groove 18g formed in charge pump housing 19, as shown in FIG. 4, so as to supply fluid from the external hydraulic actuating implement through the pipe to charge check valves 11 fitted in center section 18. However, in the case of left transaxle T1 in the hydraulic circuit shown in FIG. 5, where hydraulic pressure returning port P2 is unnecessary, pipe joint 62 may be replaced with an outwardly closed plug, or housing 1 may be made to have only pipe joint 61 (port P3), as shown in FIG. 7. Alternatively, a bypass pipe may be disposed along housing 1 and interposed between pipe joints 61 and 62 so as to bypass between ports P3 and P2.

Implement relief valve 15 (see FIG. 5) for regulating hydraulic pressure of fluid to port P1 or P3 is disposed in charge pump housing 19 so as to release excessive fluid to charge fluid groove 18g. Charge relief valve 16 (see FIG. 5) for regulating hydraulic pressure of fluid in charge fluid groove 18g is disposed in charge pump housing 19 so as to release excessive fluid to the fluid sump in housing 1.

As shown in FIG. 4, vertical charge ports 18h and 18i are bored in center section 18, opened at bottom ends thereof to charge fluid groove 18g, and opened at tops thereof to respective fluid holes 18a and 18b. A pair of charge check valve casings 11a incorporating respective charge check valves 11 are fitted in respective fluid holes 18a and 18b. When one of fluid holes 18a and 18b is hydraulically depressed, charge check valve 11 in the depressed fluid hole 18a or 18b is opened to supply fluid from charge fluid groove 18g through corresponding charge port 18h or 18i to depressed fluid hole 18a or 18b.

As shown in FIG. 4, center section 18 is bored with a vertical penetrating hole 18k at a lateral side thereof opposite to check valves 11, and with a horizontal bypass fluid hole interposed between fluid holes 18a and 18b and passing through hole 18k. A vertical bypass valve shaft 14b, serving as bypass valve 14 shown in FIG. 5, is relatively rotatably passed through hole 18k. In hole 18k of center section 18, bypass holes 14c consisting of one of more horizontal diametric penetrating holes and a vertical axial hole are bored in bypass valve shaft 14b. A bottom end of bypass valve shaft 14b slightly projects downward from center section 18 into the fluid sump in housing 1, and the vertical axial hole of bypass holes 14c is opened downward at the bottom end of bypass valve shaft 14b to the fluid sump in housing 1.

A top portion of bypass valve shaft 14b is relatively rotatably supported by the ceiling of upper housing half 1a, and projects upward from upper housing half 1a so as to be fixedly provided thereon with a bypass arm 14a. A downward projection 14d is formed on bypass arm 14a, and slidably fitted on an upwardly projecting guide portion 1f formed on a top surface of upper housing half 1a. A pair of detent recesses are formed in guide portion 1f so as to define a closed valve position and an opened valve position. A spring 14e is wound around bypass valve shaft 14b in housing 1 so as to bias bypass valve shaft 14b downward, thereby pressing projection 14d against guide portion 1f.

When bypass arm 14a is disposed so as to fit projection 14d into the detent recess defining the closed valve position, the horizontal diametric penetrating hole of bypass holes 14c is offset from the bypass fluid hole in center section 18, i.e., a peripheral surface of bypass valve shaft 14b blocks the bypass fluid hole in center section 18 from fluid holes 18a and 18b, thereby separating fluid holes 18a and 18b from each other. When bypass arm 14a is disposed so as to fit projection 14d into the detent recess defining the opened valve position, the horizontal diametric hole of bypass holes 14c is opened to the bypass fluid hole in center section 18, thereby draining fluid from fluid holes 18a and 18b to the fluid sump in housing 1. Bypass arm 14a is normally set at the closed valve position, and moved to the opened valve position when hydraulic motor M is allowed to act as a pump for hauling working vehicle 100, or when air has to be removed from fluid passages 2a and 2b of HST 2 during assembling HST 2.

As shown in FIGS. 5 and 6, working vehicle 100 is provided with an external reservoir tank 199 for distributing fluid among left and right transaxles T1 and T2 and working power clutch unit 101. A tank port 28 is provided on a front surface of housing 1 of each of transaxles T1 and T2, and fluidly connected to reservoir tank 199 through a pipe 28a.

A mechanism for controlling movable swash plate 8 of hydraulic pump P in each of transaxles T1 and T2 will be described. As shown in FIG. 3, a vertical pump control shaft 71 is disposed in front of hydraulic pump P, and projects upward from upper housing half 1a so as to be fixedly provided thereon with an outer arm 72 (see FIG. 6), which is operatively connected to either control arm 82L or 82R disposed in driver's section 80. An inner arm 73 is fixed on pump control shaft 71. A ball-shaped joint 74 is fixed on pump control shaft 71 and fitted into a recess 8a formed in a front portion of swash plate 8. When outer arm 72 is horizontally rotated by operating corresponding control lever 82L or 82R, pump control shaft 71 is rotated around its vertical axis so as to tilt swash plate 8 through ball-shaped joint 74.

As shown in FIG. 3, a neutral returning spring 75 is wound around pump control shaft 71. Both end portions of spring 75 are twisted so as to cross each other and extended in parallel. A vertical push pin 73a projects downward from inner arm 73, and a vertical retaining pin 76 is extended from the ceiling of upper housing half 1a. Push pin 73a and retaining pin 76 are disposed between the extended end portions of spring 75.

When control lever 82L or 82R is set at a neutral position, pump control shaft 71 and arms 72 and 73 are disposed at a neutral position for setting swash plate 8 at a neutral position, so that the extended both end portions of spring 75 pinch push pin 73a and retaining pin 76 therebetween so as to hold swash plate 8 at the neutral position. When control lever 82L or 82R is operated for rotating corresponding axle 4, corresponding pump control shaft 71 and arms 72 and 73 are moved from the neutral position so that push pin 73a pushes one of the end portions of spring 75 away from the other end portion of spring 75 retained by retaining pin 76, thereby causing a biasing force of spring 75 toward the neutral position. Due to the force of spring 75, when an operation force is released from control lever 82L or 82R having been moved from the neutral position, inner arm 73 with push pin 73a returns together with pump control shaft 71 and outer arm 72, so that swash plate 8 and control lever 82L or 82R naturally return to respective neutral positions.

Deceleration gear train 3 interposed between motor shaft 21 and axle 4 in each of transaxles T1 and T2 will be described. As shown in FIG. 3, deceleration gear train 3 includes motor output gear 22, a counter gear 23, bevel gears 24 and 25, a final pinion 26 and final gear 27.

A block 20 is fixed in housing 1 so as to support a vertical counter shaft 20a and a horizontal counter shaft 20b. Counter gear 23 and bevel gear 24 are fixed on vertical counter shaft 20a. Counter gear 23 meshes with motor output gear 22. Bevel gear 25 and final pinion 26 are fixed on horizontal counter shaft 20b. Bevel gear 25 meshes with bevel gear 24, and final pinion 26 meshes with final gear 27 spline-fitted on axle 4. Block 20 also determines the axial position of the gears of deceleration gear train 3 along counter shafts 20a and 20b.

A brake mechanism 30 in each of transaxles T1 and T2 will be described. As shown in FIG. 3, a vertical brake shaft 32 is relatively rotatably supported by upper housing half 1a, and projects upward from upper housing half 1a so as to be fixedly provided on a top end thereof with a brake arm 31 operatively connected to a brake pedal (not shown) in driver's section 80. In housing 1, brake shaft 32 is formed as a cam. Counter gear 23 is disposed between an upper brake shoe 35 and a lower brake shoe (not shown) in housing 1. When the brake pedal is depressed and brake shaft 32 is rotated, due to the cam of brake shaft 32, upper brake shoe 35 and the lower brake shoe presses counter gear 23 therebetween so as to brake counter shaft 20a, i.e., axle 4 and drive wheel 5.

A hydraulic operation system of hydraulic clutch 120 in working power clutch unit 101 will be described with reference to FIGS. 5, 6 and 7. Hydraulic clutch 120 in housing 104 of working power clutch unit 101 is a hydraulically actuating wet multi-disk clutch. Housing 104 is provided with a port 105 connected to hydraulic pressure extraction port P3 of one of transaxles T1 and T2 (in this embodiment, transaxle T1) through pipe 197. An electromagnetic directive control valve 110 is disposed in housing 104 so as to be switched between a clutch-on position and a clutch-off position. When directive control valve 110 is set at the clutch-on position, directive control valve 110 supplies fluid to hydraulic clutch 120 through an orifice 111*a* so as to engage hydraulic clutch 120. Orifice 111*a* reduces the speed of engaging hydraulic clutch 120. When directive control valve 110 is set at the clutch-off position, directive control valve 110 drains fluid from hydraulic clutch 120 to the fluid sump in housing 104 so as to disengage hydraulic clutch 120. In this regard, reservoir tank 199 is fluidly connected to housing 104 through a pipe 198, so as to absorb excessive fluid from the fluid sump in housing 104.

Working power clutch unit 101 will now be described with reference to FIGS. 8 and 9. Upper housing half 104*a* and a lower housing half 104*b* are joined and fastened to each other by bolts 140 so as to constitute housing 104. An upper portion of lower housing half 104*b* is formed into a flange whose peripheral edge is formed with radially projecting bosses 141. Lower housing half 104*b* is passed through a hole formed in connection frame 89, and bosses 141 are fitted onto a top surface of connection frame 89. Bolts 141*a* are screwed upward through connection frame 89 into respective bosses 141 so as to fasten lower housing half 104*b* to connection frame 89.

Figure 8:
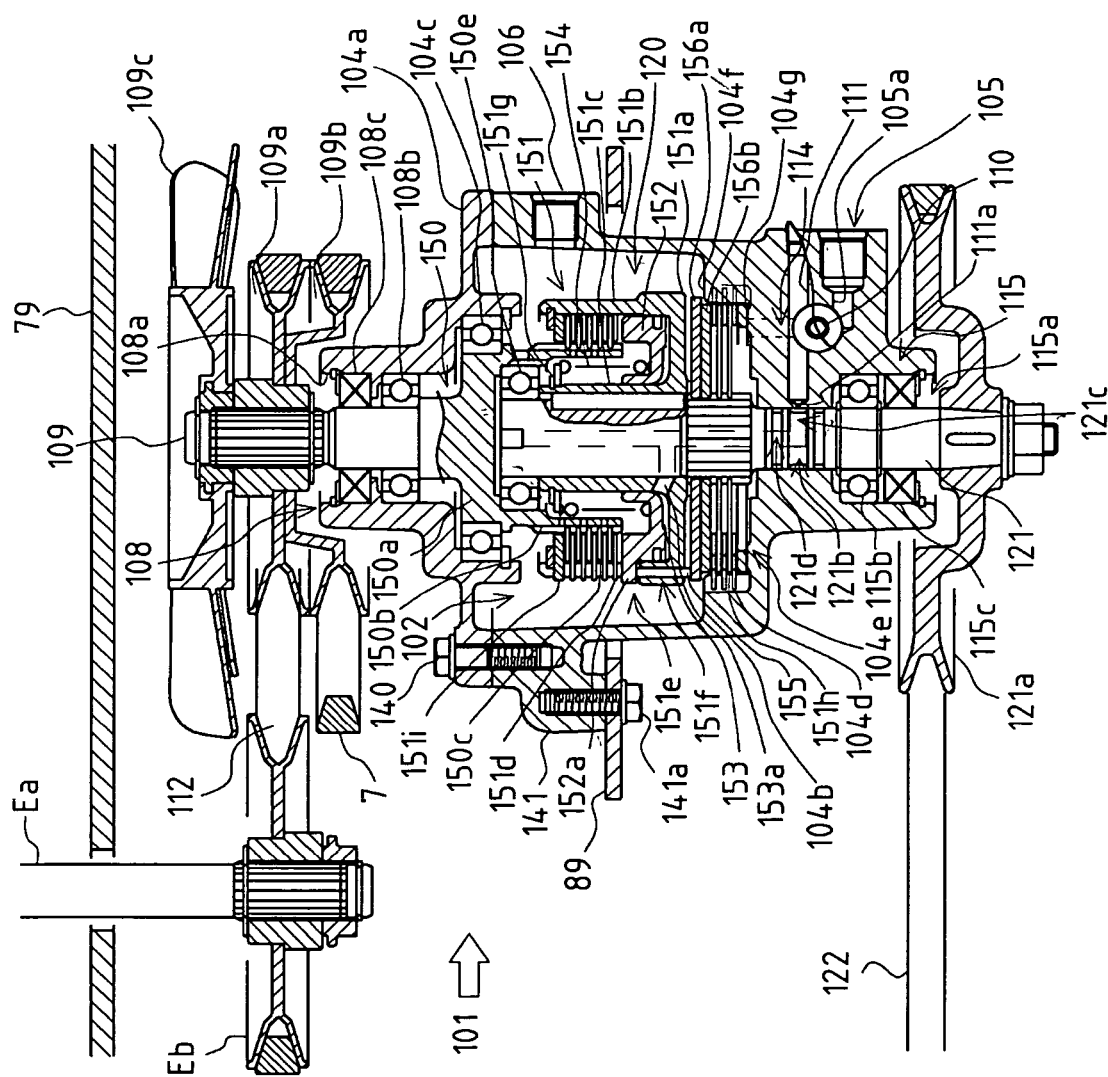
FIG. 8 is a sectional left side view of a working power clutch unit of the working vehicle according to the first embodiment.

As shown in FIG. 8, an upwardly projecting upper bearing portion 108 having an upper shaft hole 108*a* is formed on upper housing half 104*a*. Vertical input shaft 109 is inserted into upper bearing portion 108 through a seal 108*c* and a bearing 108*b* fitted in upper shaft hole 108*a*.

A top end of input shaft 109 projects upward from the top of upper bearing portion 108 (i.e., the top of housing 104) so as to be fixedly provided thereon with cooling fan 109*c*. Input pulley 109*a* is fixed on input shaft 109 between cooling fan 109*c* and the top of upper bearing portion 108, so as to be drivingly connected to engine output pulley Eb of engine E through belt 112.

Pulley 109*b* is fixed to input shaft 109 and disposed around upper bearing portion 108 just below input pulley 109*a*, so as to be drivingly connected to input pulleys 6*a* of transaxles T1 and T2 through belt 7. In housing 104, a bottom portion of input shaft 109 serves as a driving side rotor of hydraulic clutch 120. In this way, input shaft 109 and pulleys 109*a* and 109*b* serve as a driving side rotary mechanism of working power clutch unit 101.

As shown in FIG. 8, a downwardly projecting lower bearing portion 115 having a lower shaft hole 115*a* is formed on the bottom of lower housing half 104*b*. Vertical PTO shaft 121 is coaxial to input shaft 109 and inserted into lower bearing portion 115 through a seal 115*c* and a bearing 115*b* fitted in lower shaft hole 115*a*.

A bottom end of PTO shaft 121 projects downward from the bottom end of lower bearing portion 115 (i.e., the bottom of housing 104) so as to be fixedly provided thereon with output pulley 121*a* drivingly connected to mower input pulley 90*b* of mower unit 90 through belt 122. In housing 104, a top portion of PTO shaft 121 serves as a driven side rotor of hydraulic clutch 120. In this way, PTO shaft 121 and pulley 121*a* serve as a driven side rotary mechanism of working power clutch unit 101.

Input shaft 109 with pulleys 109*a* and 109*b* in the driving side rotary mechanism and PTO shaft 121 with pulley 121*a* in the driven side rotary mechanism are disposed coaxially so as to provide a compact working power clutch unit 101.

Clutch chamber 102 incorporating hydraulic clutch 120 is formed in housing 104 between upper bearing portion 108 and lower bearing portion 115.

The bottom portion of input shaft 109, serving as the driving side rotor of hydraulic clutch 120, is formed into a downwardly opened cup-shaped inner clutch rotor 150 consisting of a horizontal top wall 150*a* and a vertical cylindrical wall 150*b* extended downward from top wall 150*a*. Top wall 150*a* is journalled by upper housing half 104*a* through a bearing 104*c*. Driving side friction disks 150*c* are vertically aligned and vertically (axially) slidably spline-fitted on an outer peripheral surface of cylindrical wall 150*b*.

An outer clutch rotor 151 serves as a driven side rotor of hydraulic clutch 120. Upwardly open cup-shaped outer clutch rotor 151 includes a horizontal bottom wall 151*a*, a vertical cylindrical wall 151*b*, and a vertical axial center boss 151*c*. Cylindrical wall 151*b* is extended upward from an outer peripheral edge of bottom wall 151*a*. Center boss 151*c* is extended upward from an inner peripheral edge of bottom wall 151*a* surrounding a center hole, and relatively unrotatably fitted on PTO shaft 121 through a key.

Cylindrical wall 150*b* of inner clutch rotor 150 is disposed between center boss 151*c* and cylindrical wall 151*b* of outer clutch rotor 151. A top portion of PTO shaft 121 projects upward from center boss 151*c* of outer clutch rotor 151 and is journalled by cylindrical wall 150*b* of inner clutch rotor 150 through a bearing 150*e*.

A stopper ring 151*i* is fixed onto an inner peripheral edge of the top opening of cylindrical wall 151*b* of outer clutch rotor 151. Vertical axial grooves 151*e* are formed on vertical cylindrical wall 151*b* of outer clutch rotor 151. Driven side friction disks 151*d* are vertically aligned and vertically (axially) slidably fitted onto cylindrical wall 151*b* of outer clutch rotor 151 through grooves 151*e* below stopper ring 151*i*. In this way, driving side friction disks 150*c* and driven side friction disks 151*d* are alternately aligned vertically between cylindrical wall 150*b* of inner clutch rotor 150 and cylindrical wall 151*b* of outer clutch rotor 151.

A pressure member 152 is vertically slidably and fluidly tightly fitted between cylindrical wall 151*b* and center boss 151*c* of outer clutch rotor 151 below friction disks 150*c* and 151*d*. A clutch pressure fluid port 153*a* is bored through a bottom portion of center boss 151*c* of outer clutch rotor 151, so as to be opened to a clutch pressure fluid passage 121*d* formed in PTO shaft 121, and opened to a clutch pressure fluid chamber 153 between pressure member 152 and bottom wall 151*a* of outer clutch rotor 151.

A spring stopper 151*g* is fixed on a top portion of center boss 151*c* of outer clutch rotor 151, and a spring 154 is wound around center boss 151*c* between spring stopper 151*g* and pressure member 152 so as to bias pressure member 152 downward against the hydraulic pressure of fluid supplied into clutch pressure fluid chamber 153.

When clutch pressure fluid chamber 153 is hydraulically depressed, i.e., clutch pressure fluid chamber 153 is not supplied with fluid from clutch pressure fluid port 153*a*, pressure member 152 is disposed on bottom wall 151*a* of outer clutch rotor 151 due to the downward biasing force of spring 154, whereby friction disks 150*c* and 151*d* are separated from one another, i.e., hydraulic clutch 120 is disengaged (clutched off) so as to isolate outer clutch rotor 151 with PTO shaft 121 from the rotation of inner clutch rotor 150 with input shaft 109. An elastic spacer may be interposed in each gap between neighboring friction disks 150*c* and 151*d* so as to prevent friction disks 150*c* and 151*d* from falling by the gravity to frictionally contact one another and cause a drag torque in hydraulic clutch 120 even when clutch pressure chamber 153 is hydraulically depressed.

When clutch pressure fluid chamber 153 is filled with fluid from clutch pressure fluid port 153*a*, pressure member 152 is raised by the fluid in clutch pressure fluid chamber 153 against spring 154, whereby friction disks 150*c* and 151*d* are pressed against one another between stopper ring 151*i* and pressure member 152, i.e., hydraulic clutch 120 is engaged (clutched on), so that outer clutch rotor 151 with PTO shaft 121 becomes rotatably integral with inner clutch rotor 150 with input shaft 109. Since input shaft 109 (with inner clutch rotor 150) and PTO 121 (with outer clutch rotor 151) are coaxial, the rotational force of input shaft 109 is not changed in direction while it is transmitted to PTO shaft 121.

As mentioned above, the fluid chamber (and charge pump 9) in housing 1 of either left or right transaxle T1 or T2 serves as a hydraulic pressure fluid source for supplying fluid into clutch pressure fluid chamber 153 of hydraulic clutch 120. Referring to FIGS. 5 to 7, in this embodiment, left transaxle T1 is provided with hydraulic pressure extraction port P3, which is connected through pipe 197 to port 105 disposed on a rear surface of lower housing half 104*b*.

Figure 9:
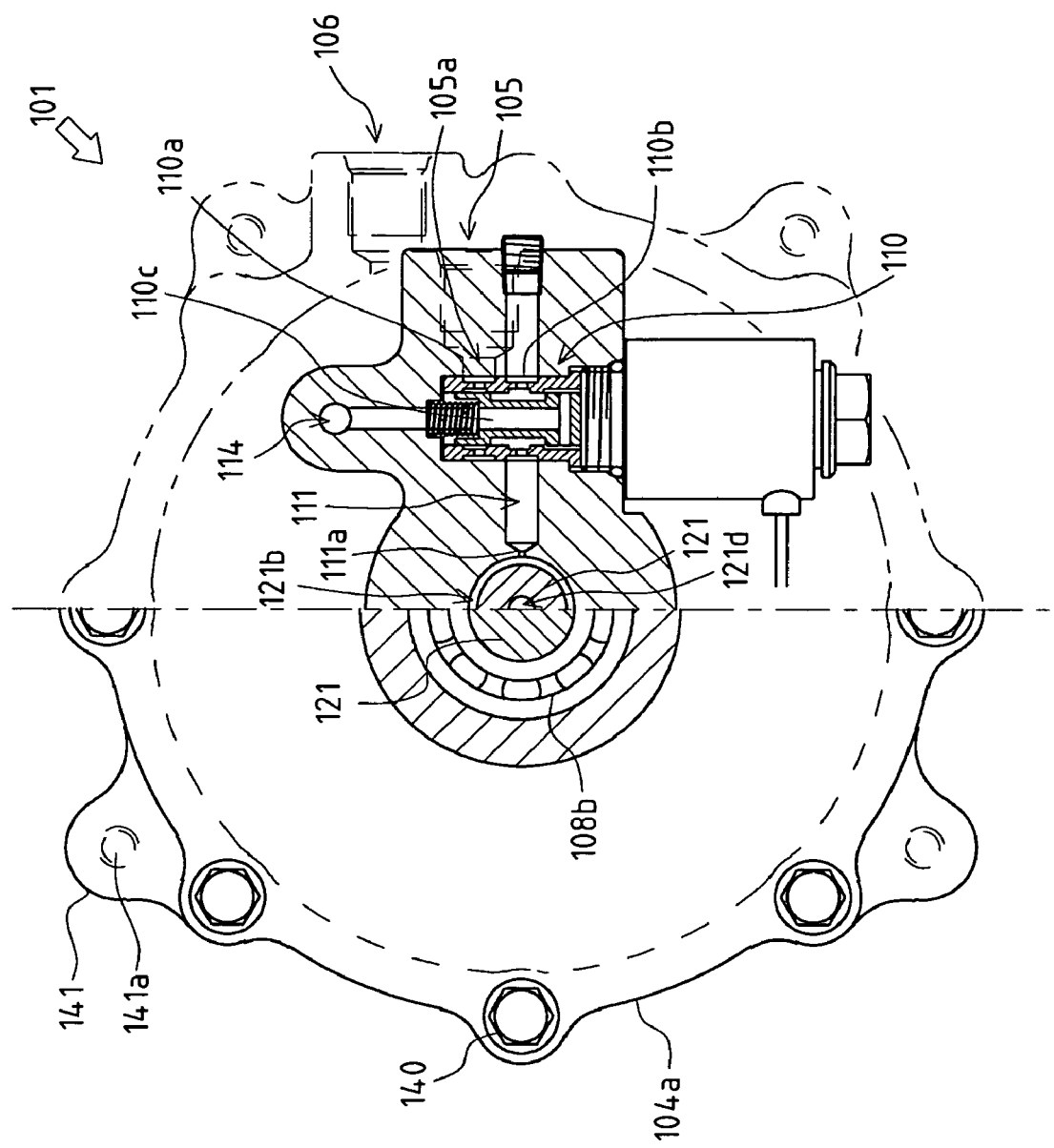
FIG. 9 is a sectional plan view of the working power clutch unit of FIG. 8.

As shown in FIGS. 8 and 9, electromagnetic directive control valve 110 is horizontally axially fitted into a thick wall of lower housing half 104*b*, which is a portion expanded rearward from lower bearing portion 115. Within the thick wall of lower housing half 104*b*, directive control valve 110 includes an inlet port 110*a*, an outlet port 110*b*, and a drain port 110*c*. A horizontal fluid passage 105*a* is bored in the thick wall of lower housing half 104*b* and interposed between port 105 and inlet port 110*a*. A drain passage 114 is bored in the thick wall of lower housing half 104*b*, extended from drain port 110*c*, and opened to the fluid sump in housing 104.

In the thick wall of lower housing half 104*b*, PTO shaft 121 in lower shaft hole 115*a* is formed with a peripheral annular groove 121*b*. A clutch pressure fluid passage 111 is bored in the thick wall of lower housing half 104*b*, extended from outlet port 110*b*, and opened to annular groove 121*b* in lower shaft hole 115*a* through orifice 111*a*. PTO shaft 121 is bored with vertical axial center fluid hole 121*d* whose top opening is plugged. Vertical axial center fluid hole 121*d* is opened at an intermediate portion thereof to clutch pressure fluid port 153*a*, and opened to annular groove 121*b* through a horizontal radial hole 121*c* bored in PTO shaft 121. Orifice 111*a* serves as a delay valve for reducing the amount of fluid introduced into or exhausted from clutch pressure fluid chamber 153, so as to moderate the clutching action of hydraulic clutch 120.

When a solenoid of directive control valve 110 is excited, directive control valve 110 is disposed at the clutch-on position, where inlet port 110*a* is fluidly connected to outlet port 110*b* so as to open passage 105*a* to passage 111, and drain port 110*c* is separated from inlet port 110*a*, thereby supplying fluid from port P3 of housing 1 of transaxle T1 to clutch pressure fluid chamber 153.

Accordingly, hydraulic clutch 120 is engaged.

When the solenoid of directive control valve 110 is unexcited, directive control valve 110 is disposed at the clutch-off position, where inlet port 110*a* is separated from outlet port 110*b* so as to shut passage 111 from passage 105*a*, and outlet port 110*b* is fluidly connected to drain port 110*c*, thereby draining fluid from clutch pressure fluid chamber 153 to the fluid sump in housing 104, i.e., clutch chamber 102. Accordingly, hydraulic clutch 120 is disengaged.

A tank port 106 is formed on a side wall of lower housing half 104*b* serving as clutch chamber 102, so as to drain excessive fluid from clutch chamber 102 to reservoir tank 199 outside working power clutch unit 101 through pipe 198.

Hydraulic clutch 120 is provided with a brake mechanism including friction disks 151*h* and friction rings 104*d*, so as to brake PTO shaft 121, i.e., the driven side rotary mechanism of working power clutch unit 101, when hydraulic clutch 120 is disengaged. In this regard, an outer peripheral wall of lower housing half 104*b* is centripetally expanded just below bottom wall 151*a* of outer clutch rotor 151. This centripetally expanded wall of lower housing half 104*b* includes a substantially horizontal top surface and a vertical inner peripheral surface. The substantially horizontal top surface on a top peripheral edge of the vertical inner peripheral surface serves as a later-discussed shoulder 104*f*. The vertical peripheral surface is formed thereon with vertical grooves 104*e*.

In lower housing half 104*b* at the bottom of clutch chamber 102, vertically aligned friction rings 104*d* are vertically slidably and relatively unrotatably fitted onto the inner peripheral surface of the centripetally expanded wall of lower housing half 104*b* by engaging radial projections of each of friction rings 104*d* into respective grooves 104*e*. Vertically aligned friction disks 151*h* are vertically slidably and relatively unrotatably spline-fitted on PTO shaft 121 just below bottom wall 151*a* of outer clutch rotor 151. Friction disks 151*h* and friction rings 104*d* are vertically alternately aligned between PTO shaft 121 and the vertical inner peripheral surface of lower clutch housing 104*b*.

A substantially horizontal top surface of lower bearing portion 115 (i.e., a bottom surface of clutch chamber 102) is disposed below the lowest friction ring 104*d*, and a stopper ring 104*g* is fitted onto the top surface of lower bearing portion 115 just below the lowest friction ring 104*d*. Horizontal upper and lower pressure plates 156*a* and 156*b* are vertically slidably spline-fitted on PTO shaft 121 between bottom wall 151*a* of outer clutch rotor 151 and the highest friction ring 104*d*. Upper pressure plate 156*a* is slightly diametrically larger than lower pressure plate 156*b*. A bottom surface of the outer peripheral edge of upper pressure plate 156*a* is adapted to be fitted on shoulder 104*f*. Lower pressure plate 156*b* is slightly diametrically smaller than the inner periphery of shoulder 104*f*, and adapted to be fitted on the highest friction ring 104*d*. In this way, friction disks 151*h* and friction rings 104*d* are vertically alternately aligned between lower pressure plate 156*b* and stopper ring 104*g*.

Pressure member 152 is partly formed with a connection portion 152*a* radially projecting from an outer peripheral edge thereof. Connection portion 152*a* is vertically slidably fitted into vertical groove 151*e* formed on cylindrical wall 151*b* of outer clutch rotor 151. A vertical penetrating hole 151*f* is bored in cylindrical wall 151*b* of outer clutch rotor 151 and extended downward from the bottom of vertical groove 151*e* in which connection portion 152*a* is fitted. Hole 151*f* is opened downward at the bottom surface of bottom wall 151*a* of outer clutch rotor 151. A vertical connection pin 155 is axially slidably passed through hole 151*f*, and abuts at a top end thereof against connection portion 152*a* of pressure member 152, and at a bottom end thereof against upper pressure plate 156*a*.

When hydraulic clutch 120 is engaged, i.e., when pressure member 152 is raised by the hydraulic pressure of fluid supplied into clutch pressure chamber 153, connection pin 155 is not pressed downward by pressure member 152, whereby friction disks 151*h* and friction rings 104*d* are separated from one another so as to allow PTO shaft 121 to be rotated by the rotation of input shaft 109 through hydraulic clutch 120. When hydraulic clutch 120 is disengaged, pressure member 152 is lowered so as to press pressure plates 156*a* and 156*b* downward through connection pin 155, whereby friction disks 151*h* and friction rings 104*d* are pressed against one another so as to brake PTO shaft 120, i.e., to prevent PTO shaft 120 from rotating due to inertia. Therefore, when hydraulic clutch 120 is disengaged, the rotary blade of mower unit 90 is locked to be stationary.

Incidentally, when pressure member 152 and connection pin 155 are lowered, the outer peripheral edge of upper pressure plate 156a finally abuts against shoulder 104f so as to prevent pressure plates 156a and 156b from being further lowered, i.e., to define the lowest position of pressure plates 156a and 156b. An elastic spacer may be interposed in each gap between neighboring friction disk 151h and friction ring 104d so as to prevent friction disks 151h and friction rings 104d from falling by the gravity to frictionally contact one another and cause a drag torque in the brake mechanism even when pressure member 152 is raised to engage hydraulic clutch 120.

A working vehicle (riding lawn mower) 200 with a power transmission system according to a second embodiment of the invention will be described with reference to FIGS. 10 to 15.

Components and portions in working vehicle 200 which are the same as those in working vehicle 100 are designated by the respective same reference numerals. Further, especially concerning a working power clutch unit 201, components and portions designated by 200-marked two-digit reference numerals have the same functions as those designated by the respective 100-marked two-digit reference numerals concerning working power clutch unit 101 in working vehicle 100. Description of these components and portions will be omitted except for special cases.

Figure 10:
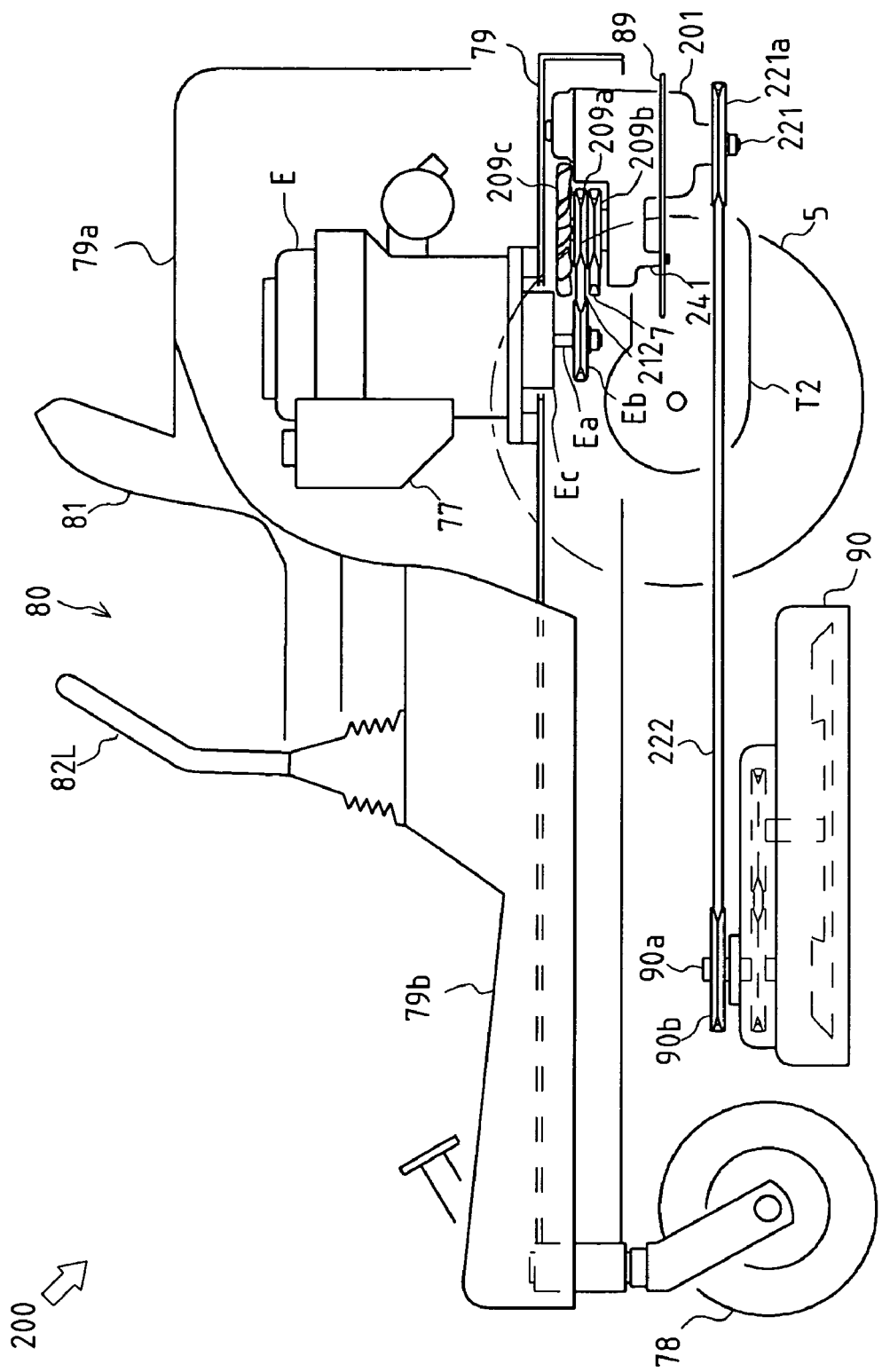
FIG. 10 is a side view partly in section of a working vehicle according to a second embodiment.
Figure 12:
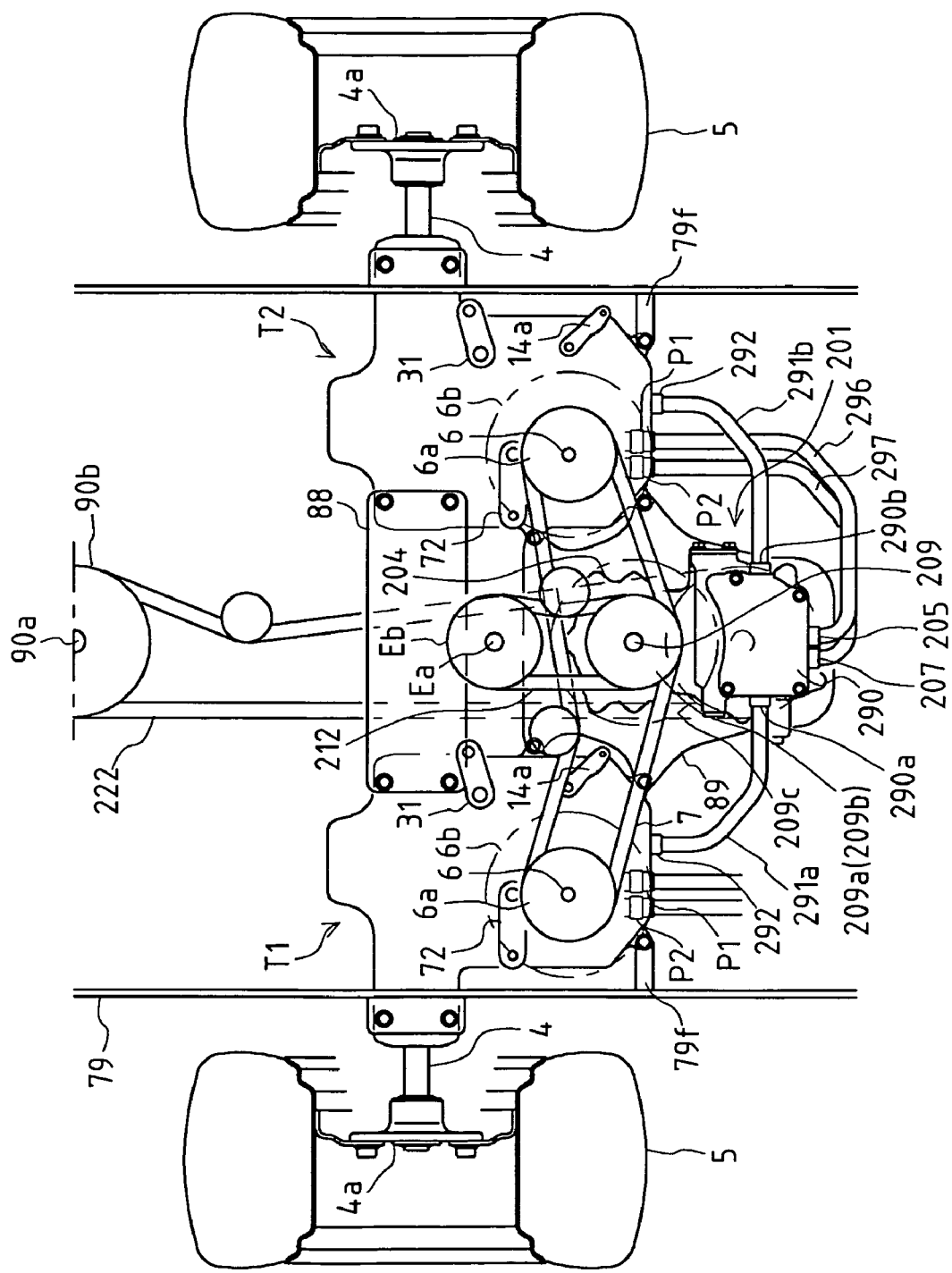
FIG. 12 is a plan view of a power transmission system of the working vehicle according to the second embodiment.
Figure 13:
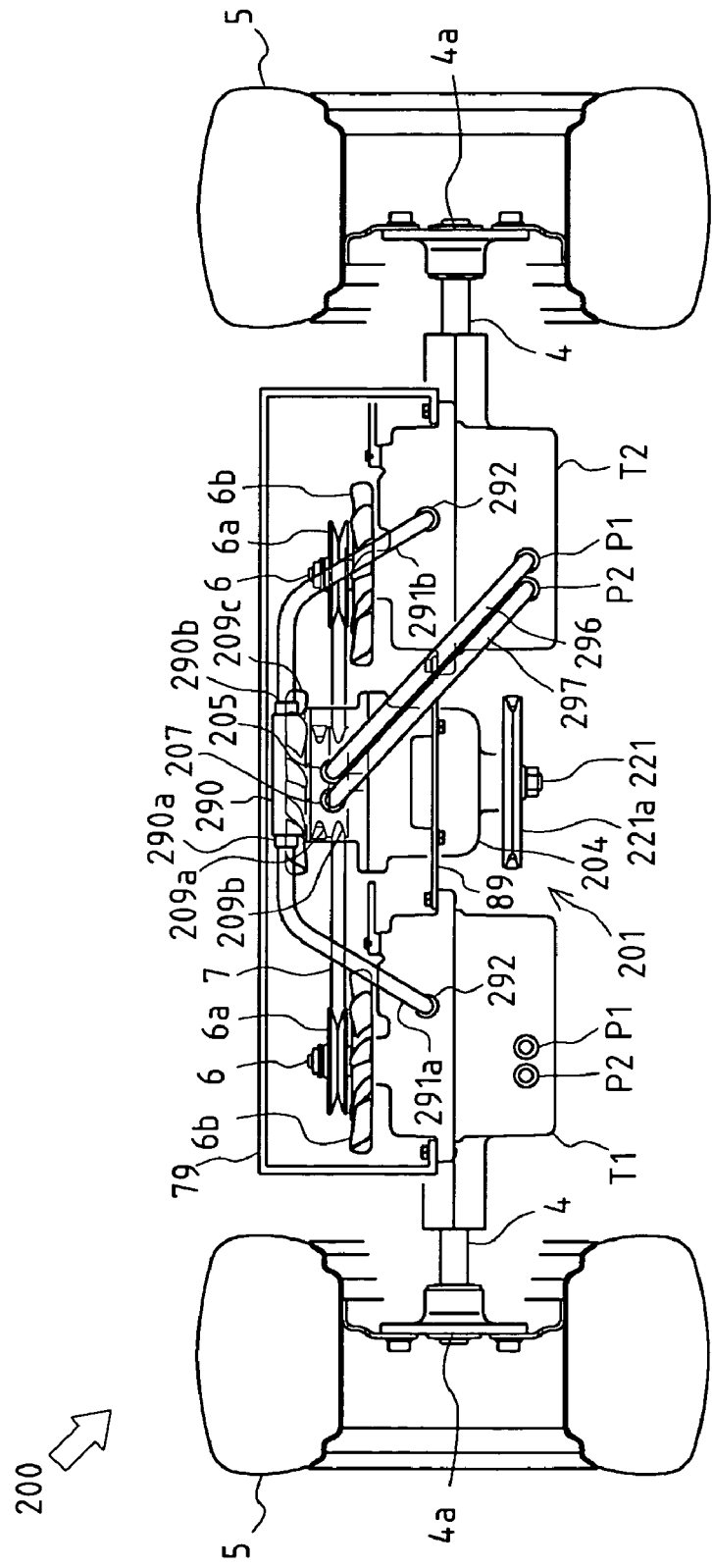
FIG. 13 is a rear view of the power transmission system of FIG. 12.
Figure 14:
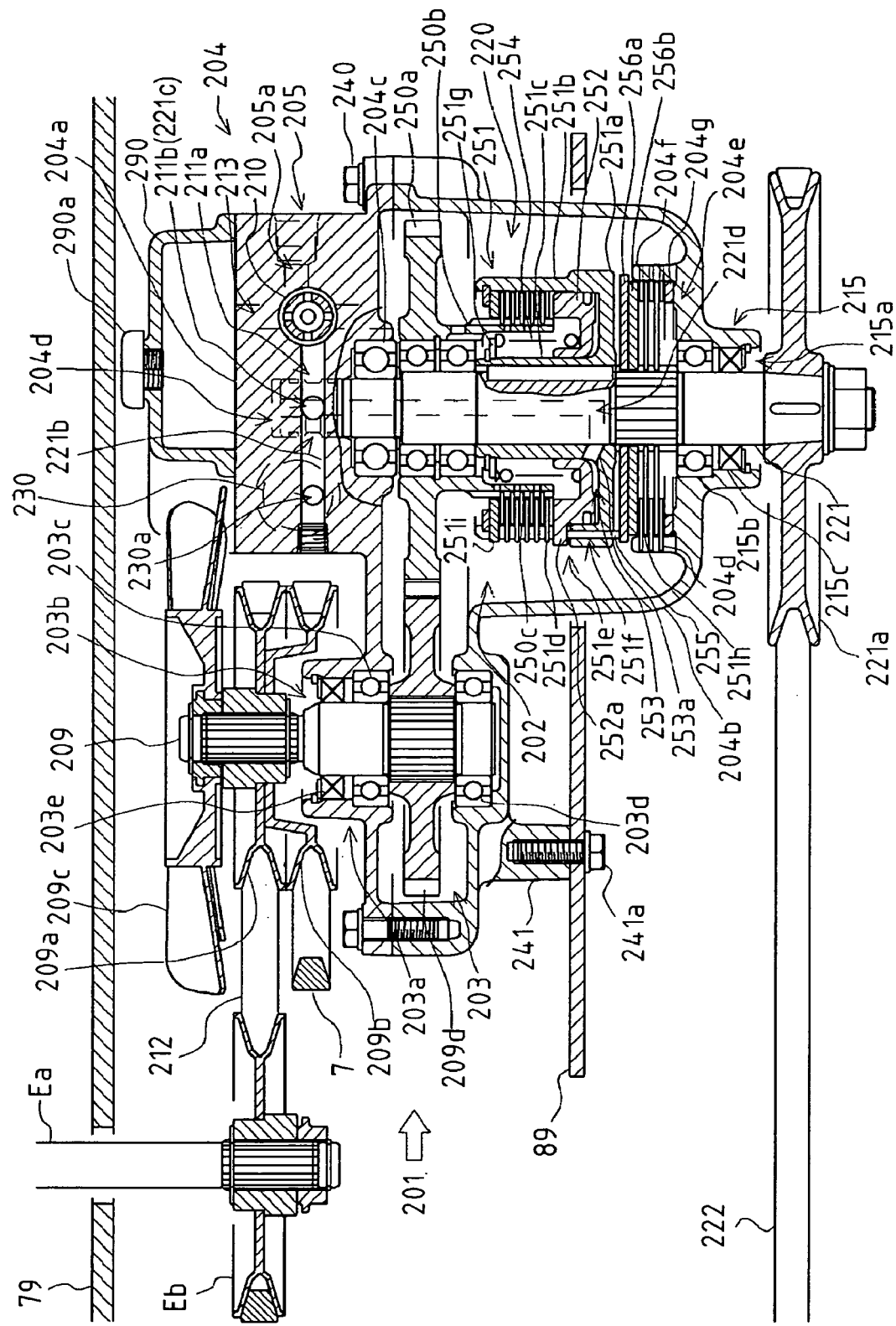
FIG. 14 is a sectional left side view of a working power clutch unit of the working vehicle according to the second embodiment.

Referring to a general structure of working vehicle 200, as shown in FIG. 10, similar to the case of working vehicle 100, engine E is mounted on the rear portion of vehicle frame 79, left and right drive wheels 5 are disposed on the left and right outsides of the rear portion of vehicle frame 79, and left and right transaxles T1 and T2 integrally connected to each other through connection frames 88 and 89 are disposed below engine E so as to individually drive respective drive wheels 5. A working power clutch unit 201 is supported by connection frame 89. In this regard, bosses 241 are formed on a housing 204 of working power clutch unit 201 and fastened to connection frame 89 through respective bolts 241a, as shown in FIG. 14. The power transmission assembly integrally including transaxles T1 and T2 and working power clutch unit 101 can be supplied as a unit to a vehicle maker for producing working vehicle 200.

Figure 15:
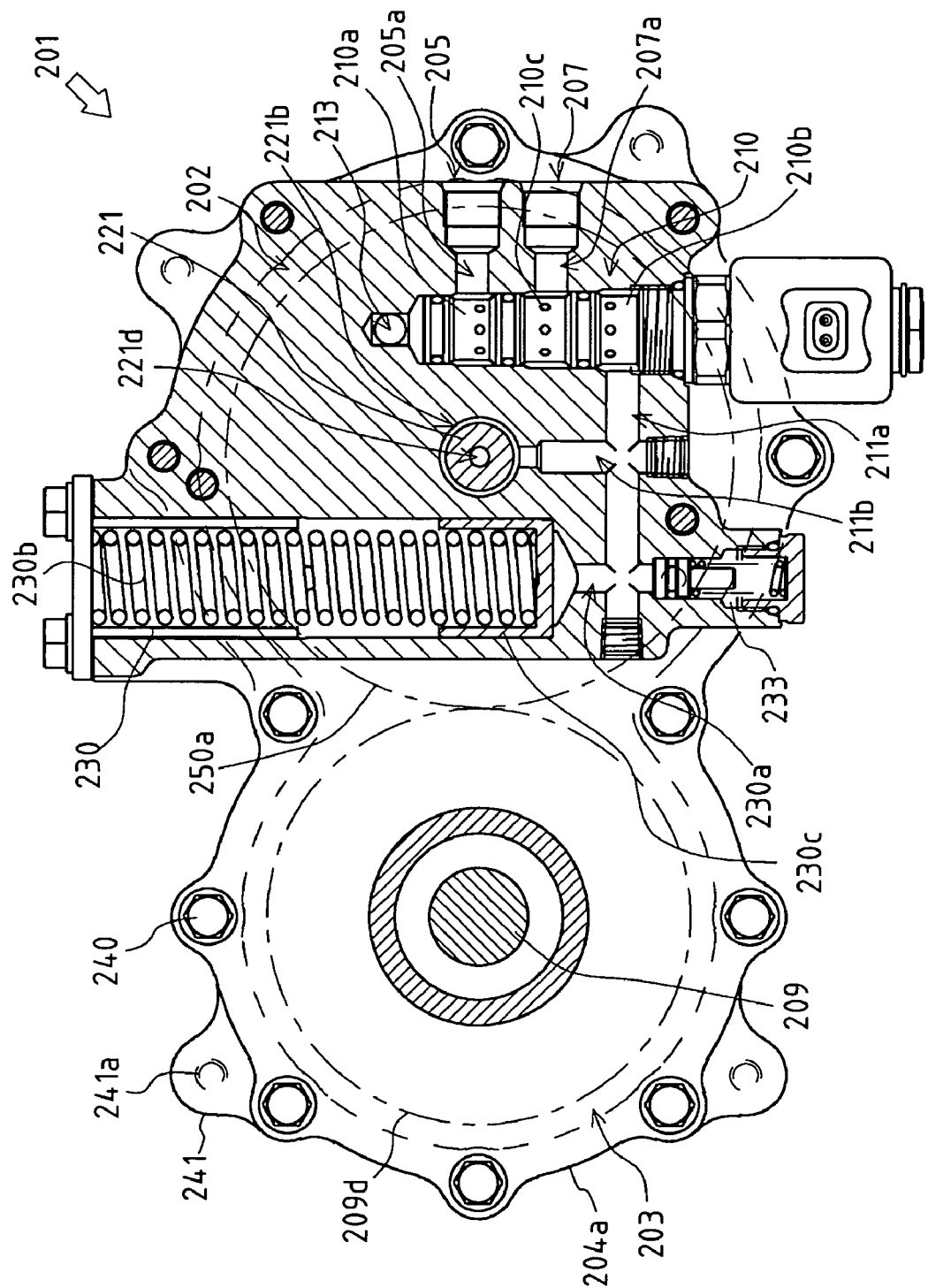
FIG. 15 is a sectional plan view of the working power clutch unit of FIG. 14.
Figure 16:
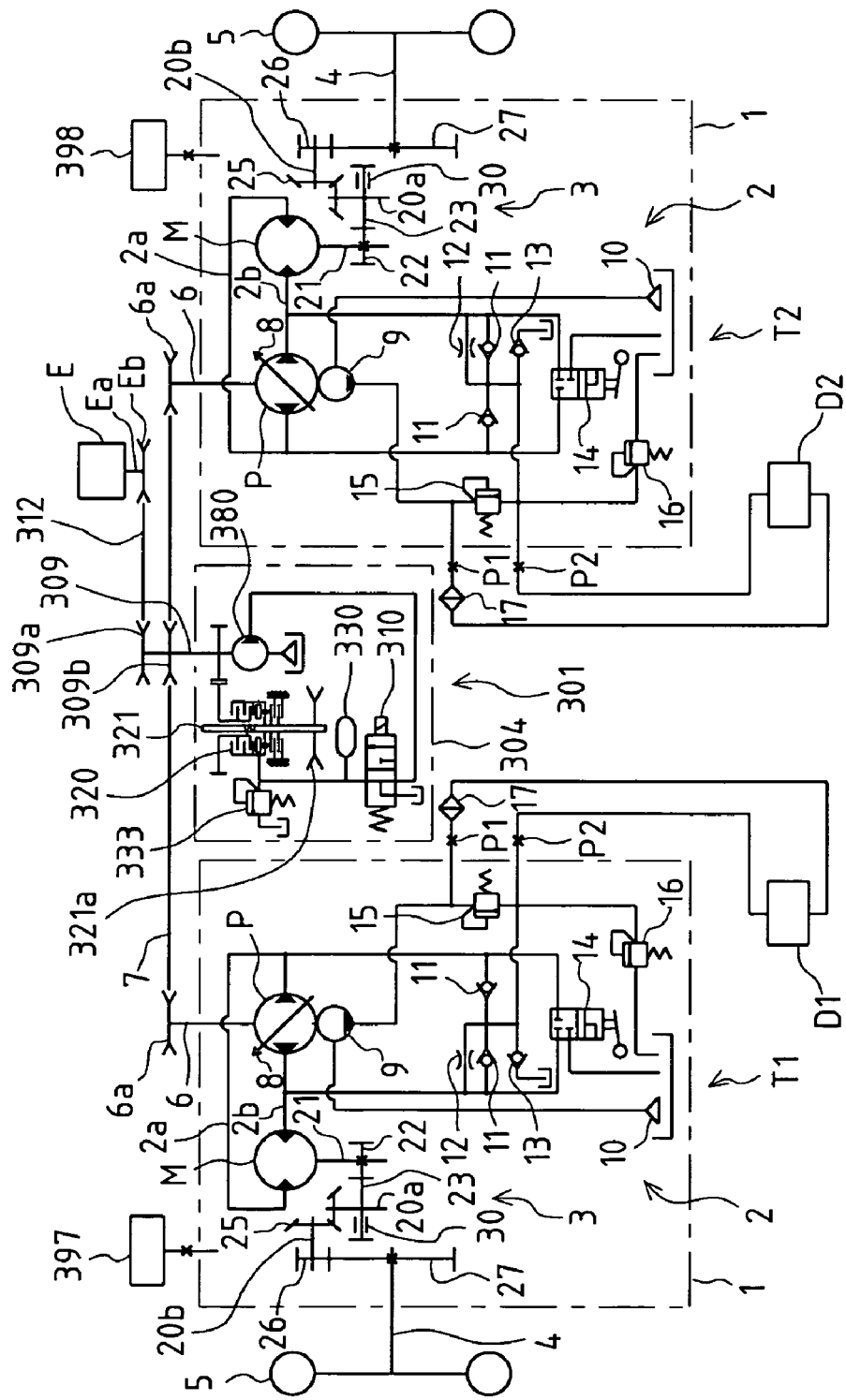
FIG. 16 is a hydraulic circuit diagram of a working vehicle according to a third embodiment.
Figure 17:
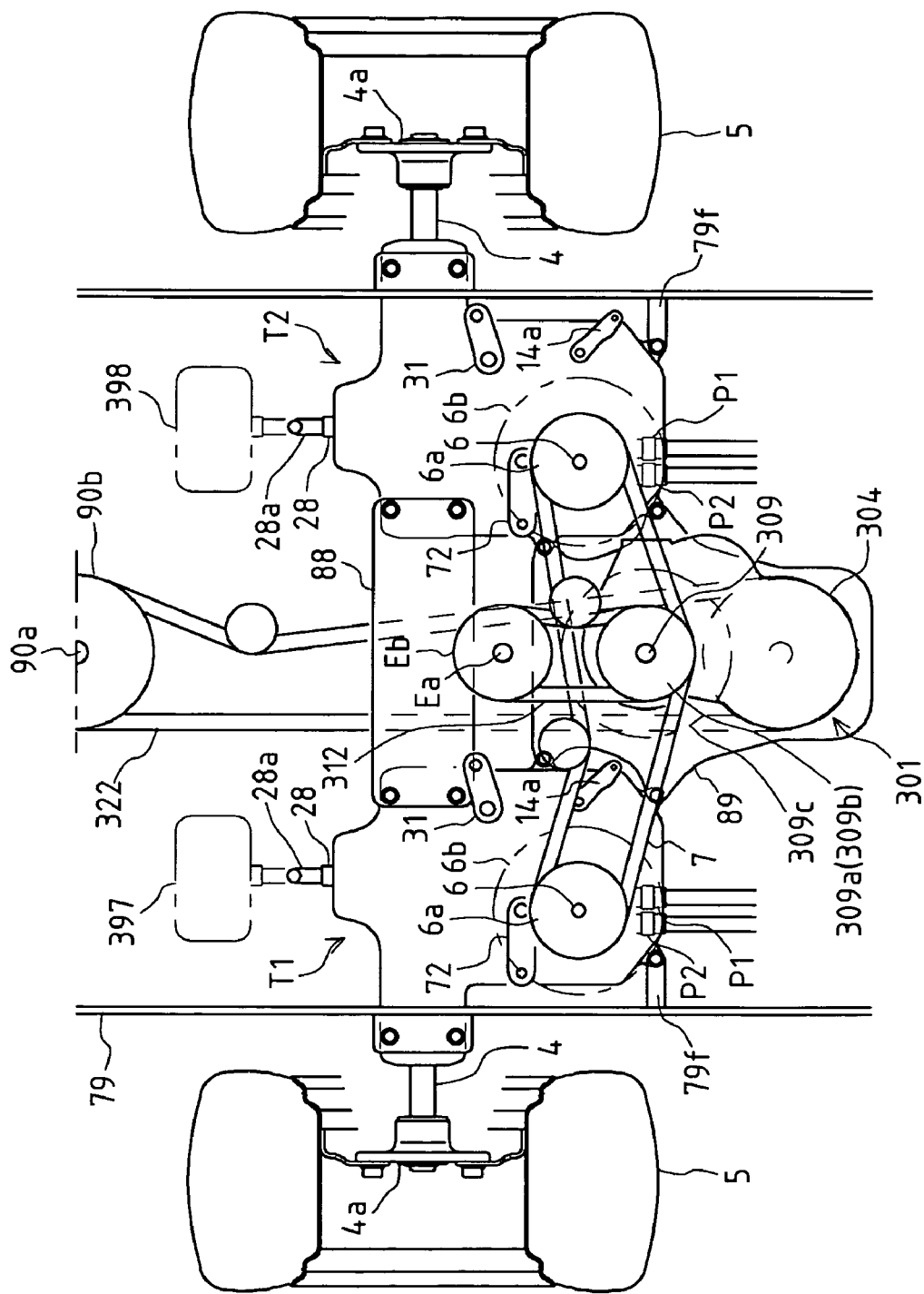
FIG. 17 is a plan view of a power transmission system of the working vehicle according to the third embodiment.
Figure 18:
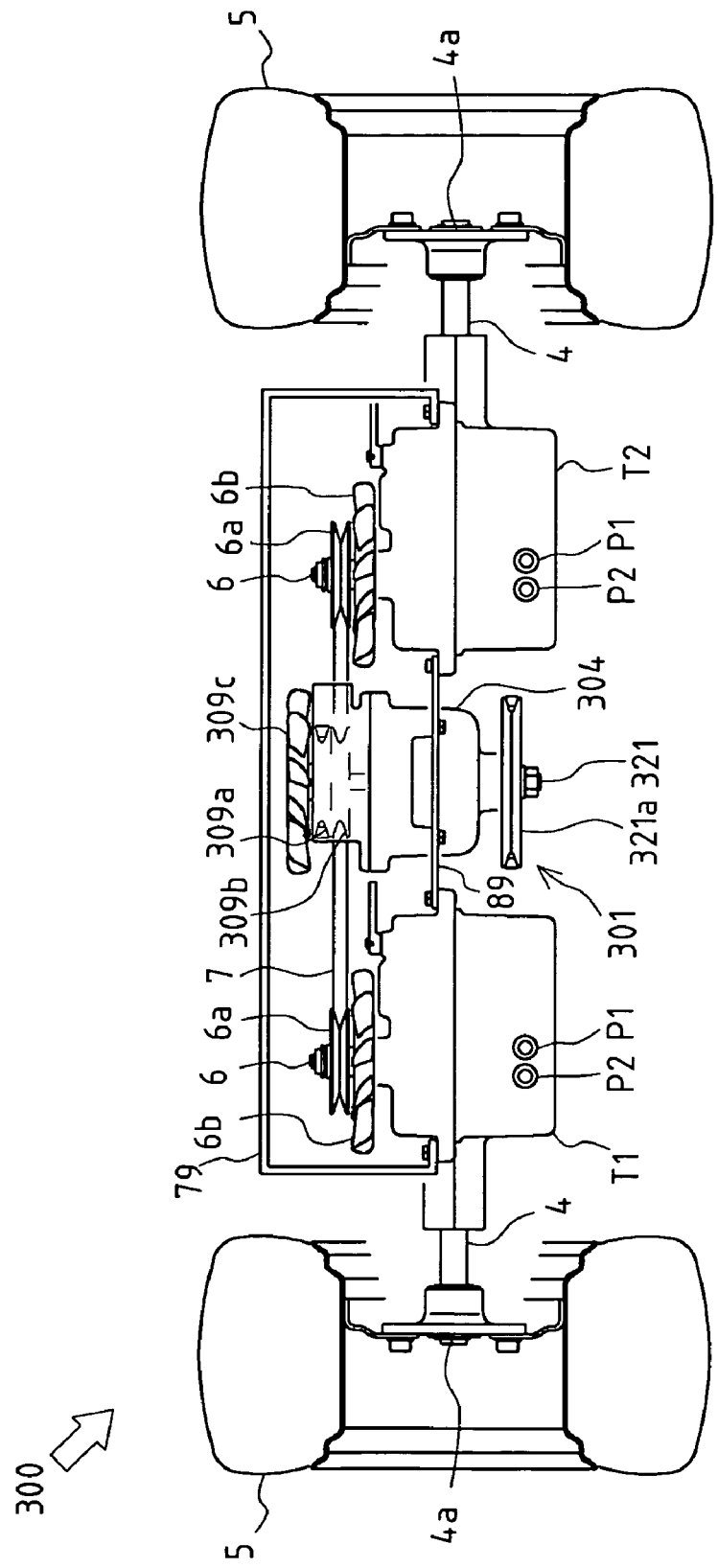
FIG. 18 is a rear view of the power transmission system of FIG. 17.

As shown in FIGS. 14 and 15, housing 204 of working power clutch unit 201 is formed by joining upper and lower housing halves 204a and 204b through bolts 240. An inner front portion of housing 204 serves as a gear chamber 203, and an inner rear portion of housing 204 serves as a clutch chamber 202 whose bottom is lower than the bottom of input gear chamber 203.

A gear 209d is fixed on a vertical input shaft 209 in gear chamber 203 so as to mesh with a later-discussed gear 250a relatively rotatably fitted on a vertical PTO shaft 221. Input shaft 209 is journalled at a bottom end thereof by lower housing half 204b just below gear chamber 203 through a bearing 203d.

Upper housing half 204a is formed with an input shaft bearing portion 203a just above gear chamber 203. Input shaft bearing portion 203a includes a vertical shaft hole 203b in which input shaft 209 above gear 209d is journalled through a bearing 203c and a fluid seal 203e. An upper portion of input shaft 209 projects upward from a top of input shaft bearing portion 203a and is fixedly provided with a cooling fan 209c, an input pulley 209a and a pulley 209b. Input pulley 209a is drivingly connected to engine output pulley Eb through a belt 212. Pulley 209b is drivingly connected to input pulleys 6a of transaxles T1 and T2 through belt 7. Input shaft 209, pulleys 209a and 209b and gears 209d and 250a constitute a driving side rotary mechanism of working power clutch unit 201.

Clutch chamber 202 incorporates a hydraulic clutch 220, i.e., a wet multi-disk clutch which is the same type clutch as hydraulic clutch 120. Hydraulic clutch 220 is coaxially provided on vertical PTO shaft 221. A wall of upper housing half 204a serves as a ceiling of clutch chamber 202 and journals a top portion of PTO shaft 221 through a bearing 204c. A bottom portion of lower housing half 204b serves as a lower bearing portion 215b journaling a lower portion of PTO shaft 221 through a shaft hole 215a, a bearing 215b and a fluid seal 215c. PTO shaft 221 projects downward from the bottom end of housing 204 (lower housing half 204b) and is fixedly provided thereon with an output pulley 221a drivingly connected to mower input pulley 90b through a belt 222. PTO shaft 221 and output pulley 221a constitute a driven side rotary mechanism of working power clutch unit 201.

Vertical PTO shaft 221 is axially offset from vertical input shaft 209 of working power clutch unit 201, so as to be disposed behind input shaft 209. Gear 209d fixed on input shaft 209 in front gear chamber 203 meshes with gear 250a relatively rotatably disposed on PTO shaft 221 in rear clutch chamber 202, so as to transmit the rotation of input shaft 209 to hydraulic clutch 220 through gears 209d and 250a. In this way, in working power clutch unit 201, input pulley 209a for receiving power from engine (prime mover) E, serving as the foremost rotor of the driving side rotary mechanism of working power clutch unit 201 upstream of hydraulic clutch 220, is not coaxial but parallel to output pulley 221a for outputting power to mower unit (working device) 90, serving as the last rotor of the driven side rotary mechanism of working power clutch unit 201 downstream of hydraulic clutch 220.

Due to the axial offset between input pulley 209a and output pulley 221a, PTO shaft 221 is disposed further rearward in comparison with PTO shaft 121 disposed coaxially to input shaft 109 in working vehicle 100, thereby increasing a distance of PTO shaft 221 from mower input shaft 90a. A belt 222 is looped between output pulley 221a and mower input pulley 90b. The increased distance reduces an angle of belt 222 slanted from a horizontal level by vertical movement of mower unit 90, thereby prolonging the life of belt 222.

Hydraulic clutch 220 includes an inner clutch rotor 250 serving as a driving side rotor of clutch 220, and an outer clutch rotor 251 serving as a driven side rotor of clutch 220. Outer clutch rotor 251 includes a horizontal bottom wall 251a, a vertical cylindrical wall 251b and a vertical center boss 251c. Center boss 251c is fixed (through a key) onto vertical PTO shaft 211, and friction disks 251d are vertically slidably and relatively unrotatably engaged on cylindrical wall 251b. Gear 250a meshing with gear 209d fixed on input shaft 209 is integrally formed on a top portion of inner clutch rotor 250. Inner clutch rotor 250 is also integrally formed with a cylindrical wall 250b extended downward from gear 250a into a space between cylindrical wall 251b and center boss 251c. Friction disks 250c are vertically slidably and relatively unrotatably engaged on cylindrical wall 250b of inner clutch rotor 250. Friction disks 250c and friction disks 251d are alternately vertically aligned and interposed between inner and outer clutch rotors 250 and 251. In this way, hydraulic clutch 220 is coaxially and drivingly interposed between gear 250a and PTO shaft 221.

A pressure member 252 serves as an actuator for selectively pressing or separating friction disks 250c and 251d against and from one another. A clutch pressure fluid chamber 253 is disposed below pressure member 252 in outer clutch rotor 251. An electromagnetic directive control valve 210 is disposed within the wall of upper housing half 204a journaling the top portion of PTO shaft 221 above gear 250a so as to supply clutch pressure fluid chamber 253 with fluid for actuating pressure member 252.

Pressure member 252 interlocks with a brake mechanism for preventing inertial rotation of PTO shaft 221 when clutch 220 is disengaged. The brake mechanism includes pressure plates 256a and 256b and friction disks 251h and friction rings 204d, and is disposed below hydraulic clutch 220 at the bottom of clutch chamber 202 just above lower bearing portion 215, similar to the brake mechanism disposed in working power clutch unit 101 and interlocking with hydraulic clutch 120.

Figure 11:
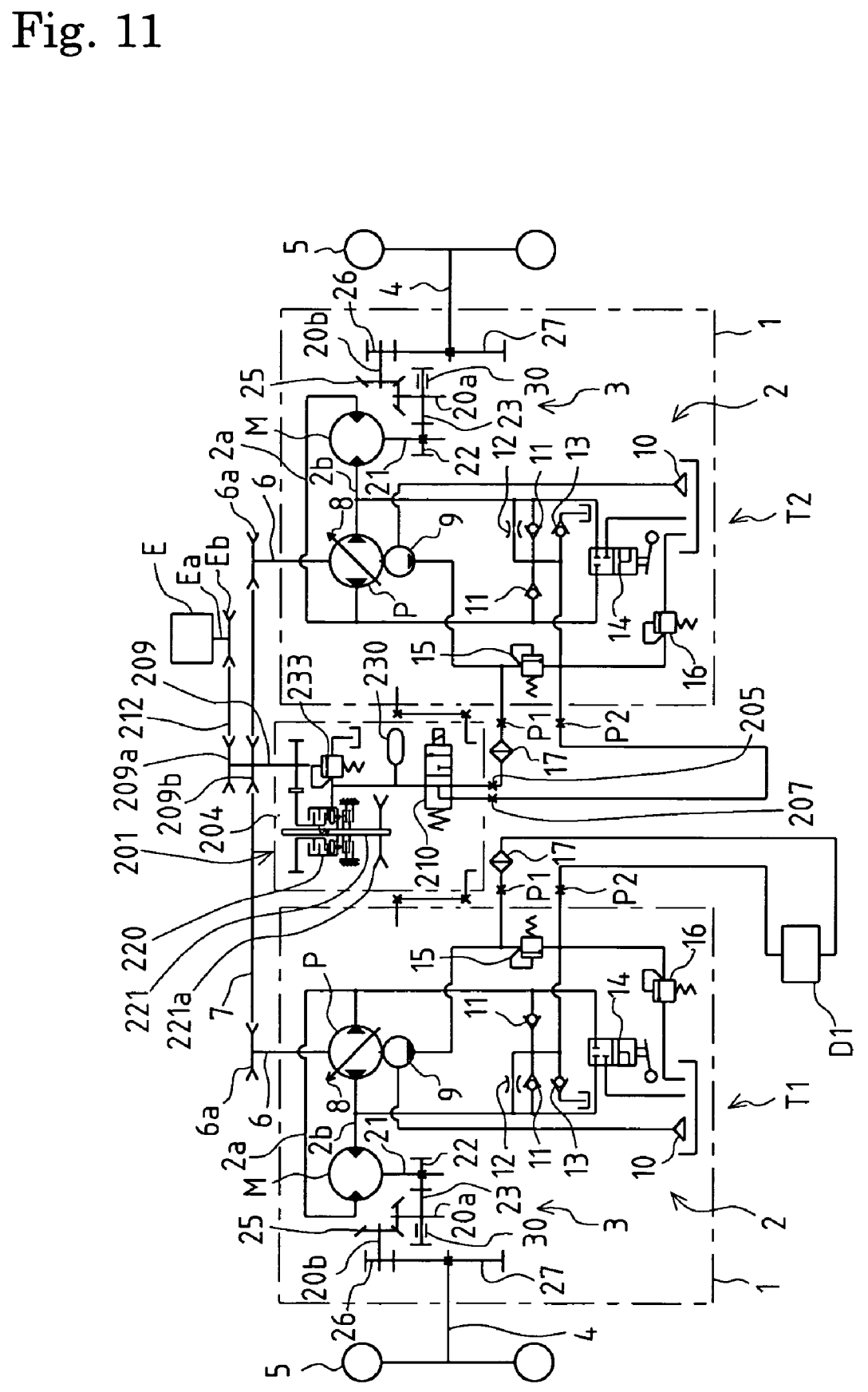

A hydraulic circuit structure of vehicle 200 as shown in FIG. 11 has some distinctive points from that of vehicle 100 as shown in FIG. 5. The distinctive points are a structure of extracting hydraulic pressure from housings 1 of transaxles T1 and T2, an accumulator 230 serving as a delay valve for hydraulic clutch 220, and a circuit for returning fluid from hydraulic clutch 220 to housing 1 of transaxle T2 when hydraulic clutch 220 is disengaged.

Housing 1 of each of transaxles T1 and T2 is provided with hydraulic pressure extraction port P1 and hydraulic pressure returning port P2. Namely, each of transaxles T1 and T2 discharges fluid delivered from charge pump 9 to the outside of housing 1 and returns the fluid into housing 1. Right and left ports 205 and 207 (see FIG. 13) are disposed on a rear surface of housing 204, and connected through respective pipes 296 and 297 (see FIGS. 12 and 13) to respective ports P1 and P2 of housing 1 of one of transaxles T1 and T2 (in this embodiment, right transaxle T2). External hydraulic actuating implement D1, such as a hydraulic actuator for lifting mower unit 90, is connected through respective pipes to ports P1 and P2 on housing 1 of the other transaxle T2 or T1 (in this embodiment, left transaxle T1). Ports P1 and P2 may be bypassed therebetween through a pipe if external hydraulic actuating implement D1 does not have to be driven by hydraulic pressure of fluid from corresponding housing 1.

Electromagnetic directive control valve 210 for supplying fluid to clutch pressure fluid chamber 253 in clutch 220 is disposed laterally within a thick wall portion of upper housing half 204a (journaling a top of PTO shaft 221) above gear 250a, in comparison with directive control valve 110 disposed within housing 104 below hydraulic clutch 120 with the brake mechanism. Directive control valve 210 includes axially aligned ports, i.e., an inlet port 210a, a drain port 210c and an outlet port 210b. Ports 205 and 207 are provided in the upper wall portion of housing 204. A fluid hole 205a is extended from port 205 to inlet port 210a, and a fluid hole 207a is extended from port 207 to drain port 210c. Outlet port 210b is fluidly connected to clutch pressure fluid chamber 253 in a later-discussed way.

When a solenoid of directive control valve 210 is unexcited, inlet port 210a and outlet port 210b are opened to drain port 210c so as to release fluid from port 205 and clutch pressure fluid chamber 253 to drain port 210c. Consequently, fluid in drain port 210c is returned into housing 1 of transaxle T2 (charge check valves 11) through port 207, pipe 297 and port P2. Clutch pressure fluid chamber 253 is hydraulically depressed so as to disengage hydraulic clutch 220. When the solenoid of directive control valve 210 is excited, inlet port 210a is opened to outlet port 210b so as to fluidly connect port 205 to clutch pressure fluid chamber 253, and drain port 210c is closed so as to shut off port 207, thereby engaging hydraulic clutch 220.

A hydraulic pressure fluid route between directive control valve 210 and clutch pressure fluid chamber 253 will be described with reference to FIGS. 14 and 15. A vertical shaft hole 204d is bored in the wall portion of upper housing half 204a above hydraulic clutch 220, an upper portion of PTO shaft 221 is rotatably disposed in shaft hole 204d, and an annular groove 221b is formed on the outer peripheral surface of PTO shaft 221 in shaft hole 204d and connected to radial fluid holes 221c and a vertical axial fluid hole 221d bored in PTO shaft 221. Fluid hole 221d is opened to clutch pressure fluid chamber 253 through a port 253a bored in outer clutch rotor 251. In the wall portion of upper housing half 204a, a fluid hole 211a is extended forward from outlet port 210b, and a fluid hole 211b is branched from a fore-and-aft intermediate portion of fluid hole 211a, and opened to shaft hole 204d, so as to be connected to fluid hole 221d in PTO shaft 221 through groove 221b and holes 221c, thereby being connected to clutch pressure fluid chamber 253 through port 253a.

A front portion of fluid hole 211b is branched to a relief valve 233 for regulating hydraulic pressure for engaging clutch 220. Excessive fluid from relief valve 233 is drained to a fluid sump in clutch housing 202. Excessive fluid in the fluid sump in clutch housing 202 is drained into a later-discussed tank 290 provided on a top of housing 204.

Accumulator 230 serves as a delay valve for hydraulic clutch 220. In this regard, a lateral cylinder hole is bored in the wall portion of upper housing half 204a. An end of the cylinder hole serving as a port 230a is connected to fluid hole 211b opposite to relief valve 233. A spring 230b and a piston 230c are disposed in the cylinder hole so that piston 230c faces port 230a and is biased toward port 230a (and relief valve 233). When hydraulic pressure fluid is supplied from port 205 to hydraulic clutch 220, the hydraulic pressure fluid is distributed with equal pressures between accumulator 230 and clutch pressure fluid chamber 253 which are fluidly connected in parallel to fluid hole 211a. Piston 230c is pushed by the hydraulic pressure fluid against spring 230b so as to receive the fluid into the cylinder hole through port 230a, thereby substantially increasing the volume of clutch pressure chamber 253 and reducing the flow of fluid in clutch pressure chamber 253, thereby pushing pressure member 252 upward to engage clutch 220.

Reservoir tank 290 is integrally provided on the top of housing 204 (upper housing half 204a), as shown in FIG. 14. A breather cap 290a is provided on a top of reservoir tank 290. Tank 290 is provided on left and right side walls thereof with respective ports 290a and 290b (see FIGS. 12 and 13) opened to respective tank ports 292 disposed on rear surfaces of housings 1 of respective transaxles T1 and T2 through respective pipes 291a and 291b. In this way, reservoir tank 290 provided on working power clutch unit 201 is shared between left and right transaxles T1 and T2.

Reservoir tank 290 is disposed in a dead space between working power clutch unit 201 and vehicle frame 79 as shown in FIG. 14, so as to require no additional space in working vehicle 200. Cooling fan 209c is fixed on the top of input shaft 209 projecting upward from the front portion of housing 204, and reservoir tank 290 is disposed just behind cooling fan 209c so as to effectively receive cooling air blown from cooling fan 209c.

A working vehicle 300 and a power transmission system with a working power clutch unit 301 according to a third embodiment of the invention will be described with reference to FIGS. 16 to 20.

Components and portions in working vehicle 300 which are the same as those in working vehicles 100 and 200 are designated by the respective same reference numerals. Further, especially concerning working power clutch unit 301, components and portions designated by 300-marked two-digit reference numerals have the same functions as those designated by the respective 200-marked two-digit reference numerals concerning working power clutch unit 201 in working vehicle 200. Description of these components and portions will be omitted except for special cases.

Figure 20:
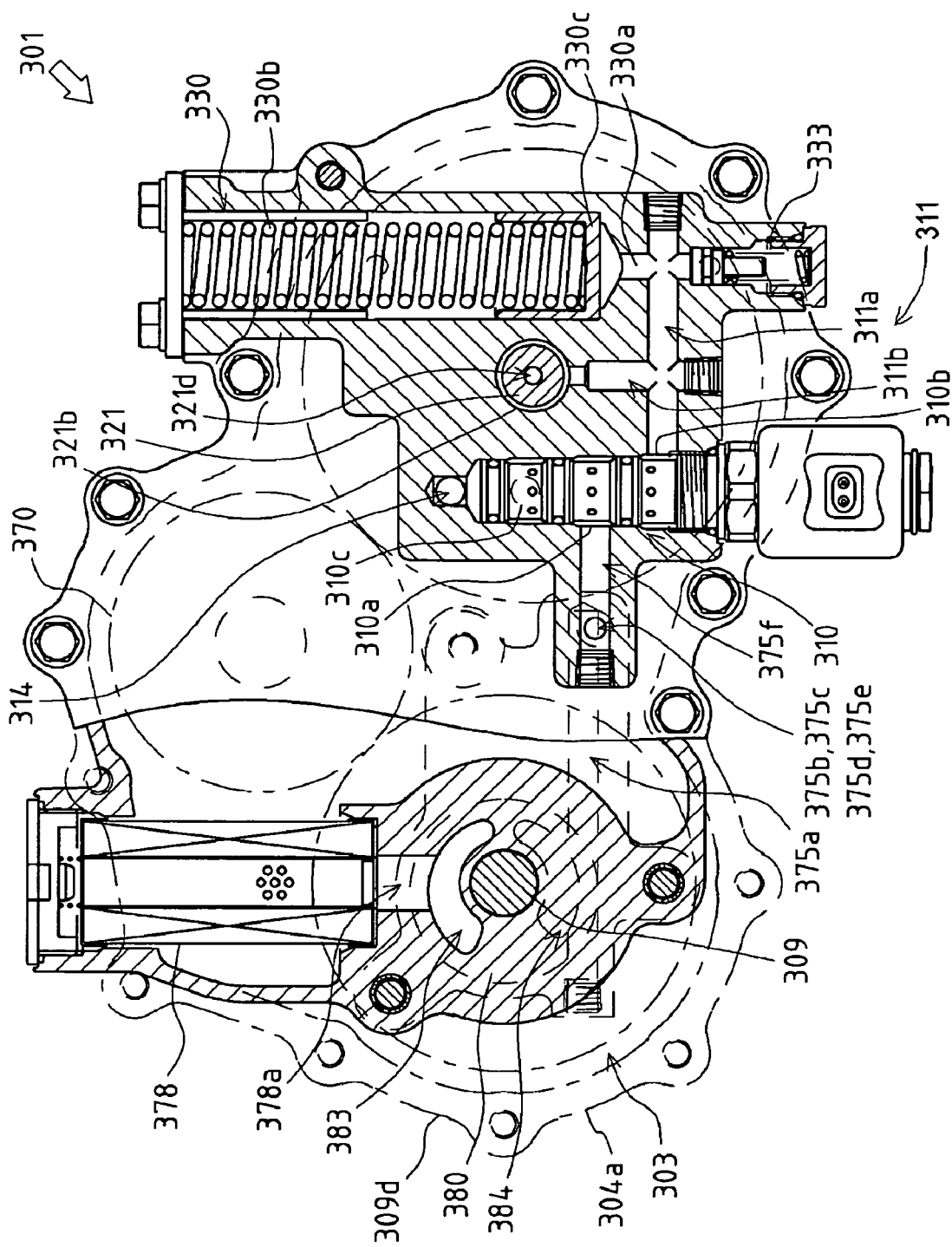
FIG. 20 is a sectional plan view of the working power clutch unit of FIG. 19.

The same point of working power clutch unit 301 as working clutch unit 201 is an axial offset of a PTO shaft 321 with a hydraulic clutch 320 (rearward) from an input shaft 309. A distinctive point of working power clutch unit 301 from working power clutch unit 201 is an idle gear 370, as shown in FIG. 20, drivingly interposed between a gear 309d fixed on input shaft 309 and a gear 350a formed on an inner clutch rotor 350 serving as a driving side rotor of hydraulic clutch 320. Therefore, PTO shaft 321 serving as an output shaft of hydraulic clutch 320 rotates in the same direction with input shaft 309, thereby agreeing the rotary direction of mower input shaft 90a (mower input pulley 90b) with the rotary direction of engine output shaft Ea (engine output pulley Eb).

In other words, working power clutch unit 301 whose input and output rotary directions are the same is provided for working vehicle 300 equipped with mower unit 90 whose input rotary direction is the same with the output rotary direction of engine E, while working power clutch unit 201 whose input and output rotary directions are opposite to each other is provided for working vehicle 200 equipped with mower unit 90 whose input rotary direction is opposite to the output rotary direction of engine E. Namely, one of working power clutch units 201 and 301 can be selected depending on whether or not the input rotary direction of the working device is the same with the output rotary direction of the prime mover.

Figure 19:
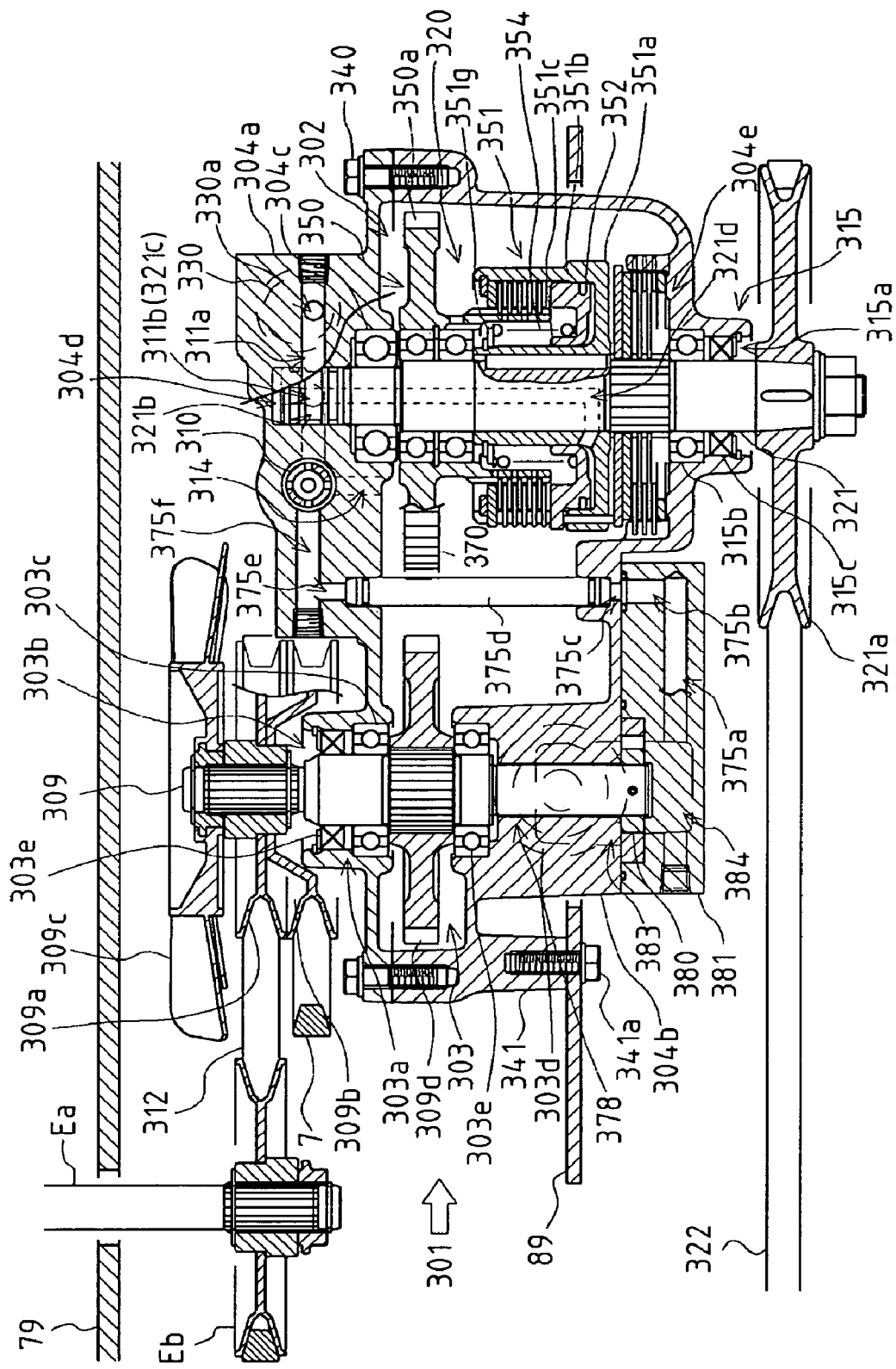
FIG. 19 is a sectional left side view of a working power clutch unit of the working vehicle according to the third embodiment.

Another distinctive point of working power clutch unit 301 from working power clutch unit 201 is an auxiliary pump 380 disposed in working power clutch unit 301. As shown in FIGS. 19 and 20, a housing 304 of working power clutch unit 301 is formed by joining upper and lower housing halves 304a and 304b through bolts 340. An inner front portion of housing 304 serves as a gear chamber 303 incorporating gear 309d, and an inner rear portion of housing 304 serves as a clutch chamber 302 incorporating hydraulic clutch 320.

A pump housing 381 incorporating auxiliary pump 380 is fixed onto a bottom surface of a thickened front bottom wall of lower housing half 304b just below gear 309d.

The thick bottom wall of lower housing half 304b just below gear 309d fixed on input shaft 309 is provided with a vertical penetrating shaft hole 303d into which a lower portion of input shaft 309 is relatively rotatably fitted through a bearing 303e. A bottom end of input shaft 309 projects downward from the bottom of lower housing half 304b into pump housing 381, so as to serve as a drive shaft of auxiliary pump 380.

Auxiliary pump 380 supplies fluid to a clutch pressure fluid chamber 353 of hydraulic clutch 320 through an electromagnetic directive control valve 310. Therefore, no pipe is extended from housing 1 of either transaxle T1 or T2 so as to supply fluid to directive control valve 310 (see FIG. 18).

As shown in FIG. 20, a suction port 383 is bored in the thick bottom wall of lower housing half 304b and opened at the bottom surface of lower housing half 304b into a pump chamber which is formed in pump housing 381 so as to incorporate inner and outer rotors of trochoidal pump 380. A horizontal fluid hole 378a is bored in the thick bottom wall of lower housing half 304b, and extended from suction port 383 so as to be opened to a fluid sump in housing 304. A fluid filter 378 is disposed in the fluid sump in housing 304 and fitted onto a side surface of the thick bottom wall of lower housing half 304b so as to cover the open end of fluid hole 378a, thereby supplying fluid from the fluid sump into suction port 383 through fluid filter 378 and fluid hole 378a.

A delivery port 384 is formed in pump housing 381 and extended downward from the pump chamber. Suction port 383 and delivery port 384 are symmetric with respect to input shaft 309 when viewed in plan. In pump housing 381, a fore-and-aft horizontal fluid hole 375a is extended from a (left) side of delivery port 384, and a vertical fluid hole 375b is extended upward from a rear end of fluid hole 375a and opened to a vertical penetrating fluid hole 375c bored in a bottom wall of lower housing half 304b. A vertical fluid hole 375e is bored in a wall of upper housing half 304a and opened downward.

A vertical pipe 375d is interposed between the top opening of fluid hole 375c and the bottom opening of fluid hole 375e.

Directive control valve 310 including axially aligned drain port 310c, inlet port 310a and outlet port 310b is disposed laterally axially in the wall of upper housing half 304a. A fore-and-aft horizontal fluid hole 375f is bored in the wall of upper housing half 304a and connected at a rear end thereof to inlet port 310a of directive control valve 310. A vertical fluid hole 314 is bored in the wall of upper housing half 304a, extended downward from drain port 310c of directive control valve 310, and opened to the fluid sump in housing 304.

A fore-and-aft horizontal fluid hole 311a is bored in the wall of upper housing half 304a and extended from outlet port 310b of directive control valve 310. A fluid hole 311b is branched from an intermediate portion of fluid hole 311a and opened to a vertical shaft hole 304d in which a top portion of PTO shaft 321 is inserted. Similar to PTO shaft 221, PTO shaft 321 is formed with a fluid passage including an annular groove 321b, radial holes 321c and an axial hole 321d. Further, similar to outer clutch rotor 251, an outer clutch rotor 351 serving as a driven side rotor of hydraulic clutch 320 is provided with a port 353a interposed between clutch pressure fluid chamber 353 and the fluid passage formed in PTO shaft 322. Therefore, fluid hole 311b is opened to clutch pressure fluid chamber 353 of hydraulic clutch 320 through the fluid passage formed in PTO shaft 321 and outer clutch rotor 351.

Fluid hole 311a is connected at a rear end portion thereof to accumulator 330 for moderating the clutching action of hydraulic clutch 320, and to relief valve 333 for regulating hydraulic pressure of fluid in clutch pressure fluid chamber 353.

Relief valve 333 releases excessive fluid to the fluid sump in housing 304, and drain port 310c of directive control valve 310 drains fluid to the fluid sump when directive control valve 310 is set for disengaging hydraulic clutch 320. Auxiliary pump 380 absorbs fluid from the fluid sump through fluid filter 378 so as to supply fluid to inlet port 310a of directive control valve 310.

More specifically, when a solenoid of directive control valve 310 is excited, outlet port 310b is opened to inlet port 310a so as to fluidly connect fluid holes 311a and 311b to fluid hole 375f, and drain port 310c is closed so as to shut off fluid hole 314 from the fluid sump in housing 304. In this state, directive control valve 310 receives fluid delivered from auxiliary pump 380 through lower fluid holes 375a, 375b and 375c, pipe 375d and upper fluid holes 375e and 375f, and supplies the fluid to clutch pressure fluid chamber 353 through fluid holes 311a and 311b and the fluid passage formed in PTO shaft 321 and outer clutch rotor 351, so as to actuate pressure member 352 for engaging clutch 320.

When the solenoid of directive control valve 310 is unexcited, outlet port 310b and drain port 310c are opened to inlet port 310a so as to fluidly connect fluid hole 375f and a fluid passage 311 (i.e., fluid holes 311a and 311b) to fluid hole 314, thereby draining fluid delivered from pump 380 and fluid from clutch pressure fluid chamber 353 to the fluid sump in housing 304 (clutch chamber 302), so as to return pressure member 352 for disengaging clutch 320.

Hydraulic clutch 320 includes inner clutch rotor 350, outer clutch rotor 351, and friction disks 350c and 351d, similar to hydraulic clutch 220 including inner and outer clutch rotors 250 and 251 and friction disks 250c and 251d. A brake mechanism including pressure plates 356a and 356b, friction disks 351h and friction rings 304d, includes hydraulic clutch 320, and is disposed below hydraulic clutch 320 at the bottom of clutch chamber 302 just above a lower bearing portion 315 formed at a bottom of lower housing half 304b, similar to the brake mechanism disposed in working power clutch unit 201 and interlocking with hydraulic clutch 220. Description of structures of hydraulic clutch 320 and the brake mechanism is omitted.

Figure 2:
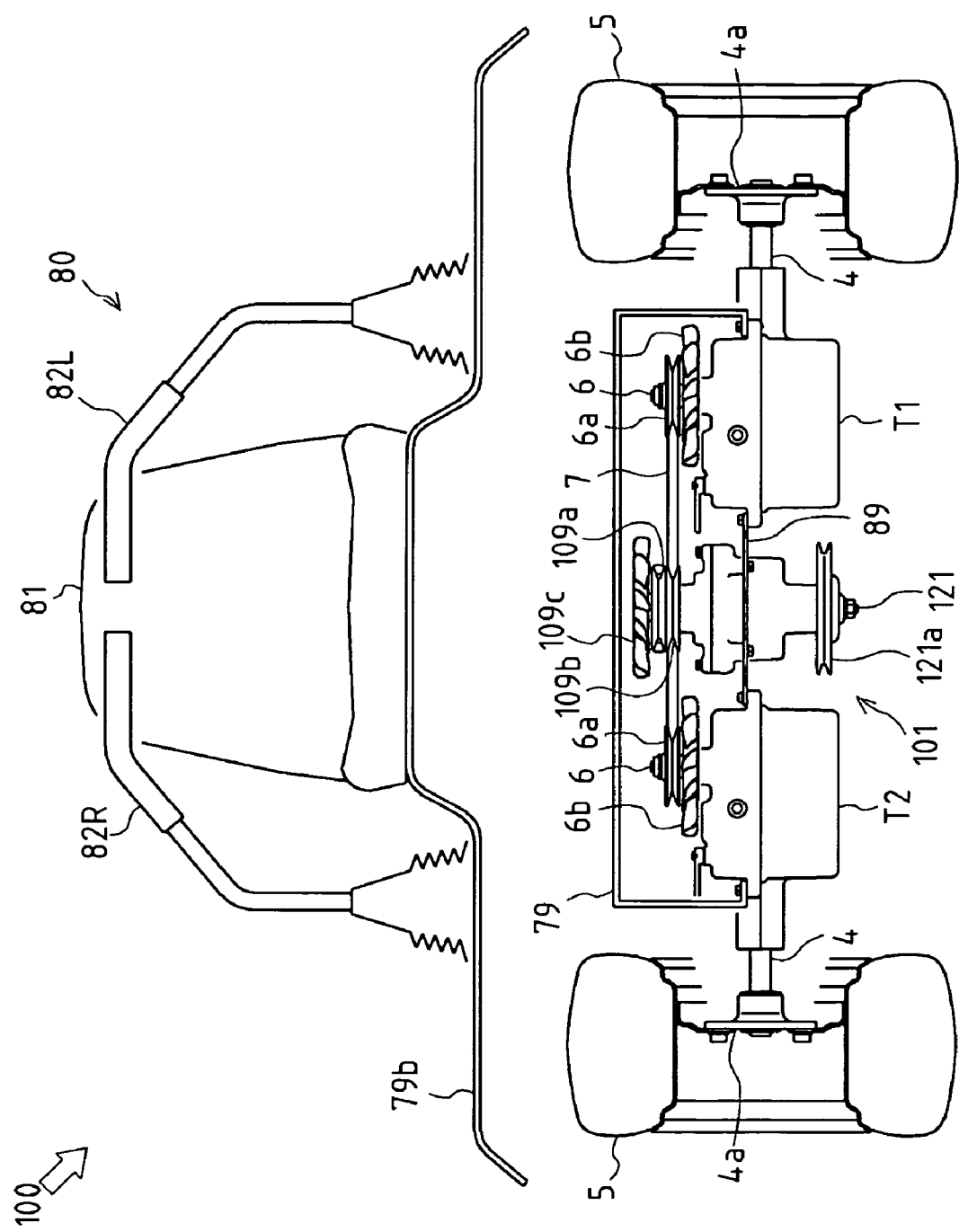
FIG. 2 is a sectional plan view of the vehicle of FIG. 1.
Figure 21:
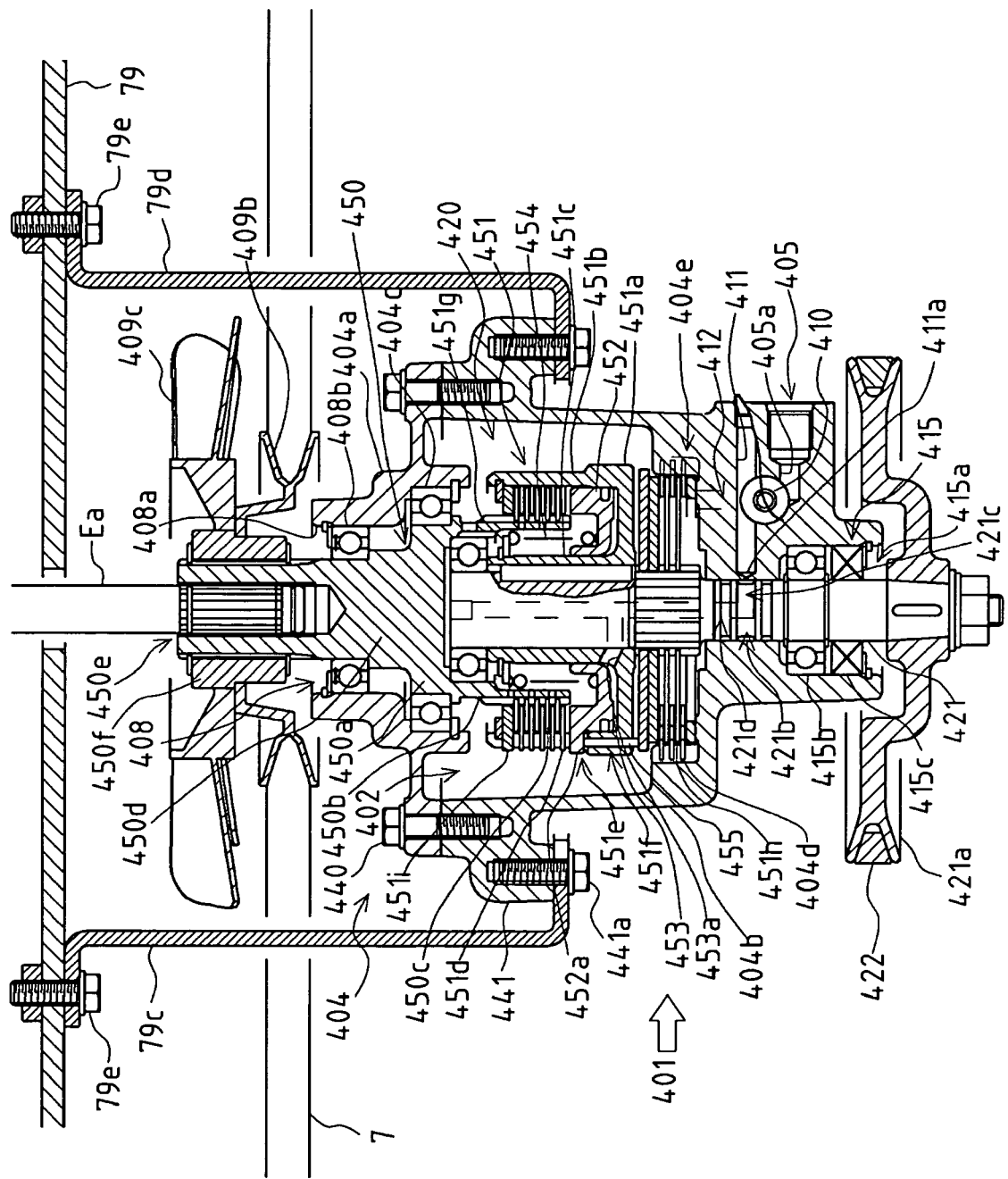
FIG. 21 is a sectional left side view of a working power clutch unit of a working vehicle according to a fourth embodiment.

A power transmission system including a working power clutch unit 401 according to a fourth embodiment of the invention will be described with reference to FIG. 21, on the assumption that the power transmission system is equipped on working vehicle 100 shown in FIGS. 1 and 2.

Concerning working power clutch unit 401, components and portions designated by 400-marked two-digit reference numerals have the same functions as those designated by the respective 100-marked two-digit reference numerals concerning working power clutch unit 101 in working vehicle 100.

Description of these components and portions will be omitted except for special cases.

A front stay 79c and a rear stay 79d are extended downward from vehicle frame 79. Each of stays 79c and 79d has a horizontal top edge fastened to vehicle frame 79 through bolts 79e. A housing 404 of working power clutch unit 401 is passed through a space between horizontal bottom edges of front and rear stays 79c and 79d. Housing 404 is formed by vertically joining upper and lower housing halve 404a and 404b through bolts 440, and lower housing half 404b is formed with bosses 441 fastened to the bottom edges of stays 79c and 79d through respective bolts 441a.

Alternatively, a cup-shaped bracket may replace front and rear stays 79c and 79d. In this case, a horizontal top peripheral edge of the bracket is fastened to vehicle frame 79 through bolts, and a horizontal bottom plate portion of the bracket is formed with a hole through which working power clutch unit 401 is passed and fastened at bosses 441 to the bottom plate portion through bolts 441a.

Housing 404 is provided therein with a clutch chamber 402 incorporating a hydraulic clutch 420. Hydraulic clutch 420 includes an inner clutch rotor 450, serving as a driving side rotor of hydraulic clutch 420, and an outer clutch rotor 451, serving as a driven side rotor of hydraulic clutch 420.

Inner and outer clutch rotors 450 and 451 are disposed coaxially to a vertical PTO shaft 421. Outer clutch rotor 451 is fixed on PTO shaft 421. PTO shaft 421 is extended downward through a lower bearing portion 415 formed on a bottom portion of lower housing half 404b, and fixedly provided thereon with an output pulley 421a for driving mower unit (working device) 90.

An input shaft portion 450d is integrally formed on a top portion of inner clutch rotor 450. Upper housing half 404a serving as a ceiling of clutch chamber 402 is formed with an upper bearing portion 408 having a vertical shaft hole 408a in which input shaft portion 409d is journalled through bearings 408b and 404c. An upper portion of input shaft portion 409d projects upward from a top of upper bearing portion 408, and is fixedly provided thereon with a cooling fan 409c and a pulley 409b drivingly connected to input pulleys 6a of transaxles T1 and T2 through belt 7.

The upper portion of input shaft portion 409d projecting upward from housing 404 is formed with an upwardly opened vertical splined hole 409e.

Engine output shaft Ea is extended downward from vehicle frame 79, and a splined bottom portion of engine output shaft Ea is vertically slidably and relatively unrotatably fitted into splined hole 409e. In this way, engine output shaft Ea is directly and coaxially connected to input shaft portion 409d integrally formed on inner clutch rotor 450 serving as a driving side rotor of hydraulic clutch 420.

Consequently, engine output shaft Ea and PTO shaft 421 are coaxially disposed, and hydraulic clutch 420 is coaxially and drivingly interposed between engine output shaft Ea and PTO shaft 421.

Input shaft 209 or 309 of either working power clutch unit 201 or 301, which is axially offset from PTO shaft 221 or 321, may be coaxially and directly connected to engine output shaft Ea in the same way as input shaft portion 450d of inner clutch rotor 450 in working power clutch unit 401.

Figure 22:
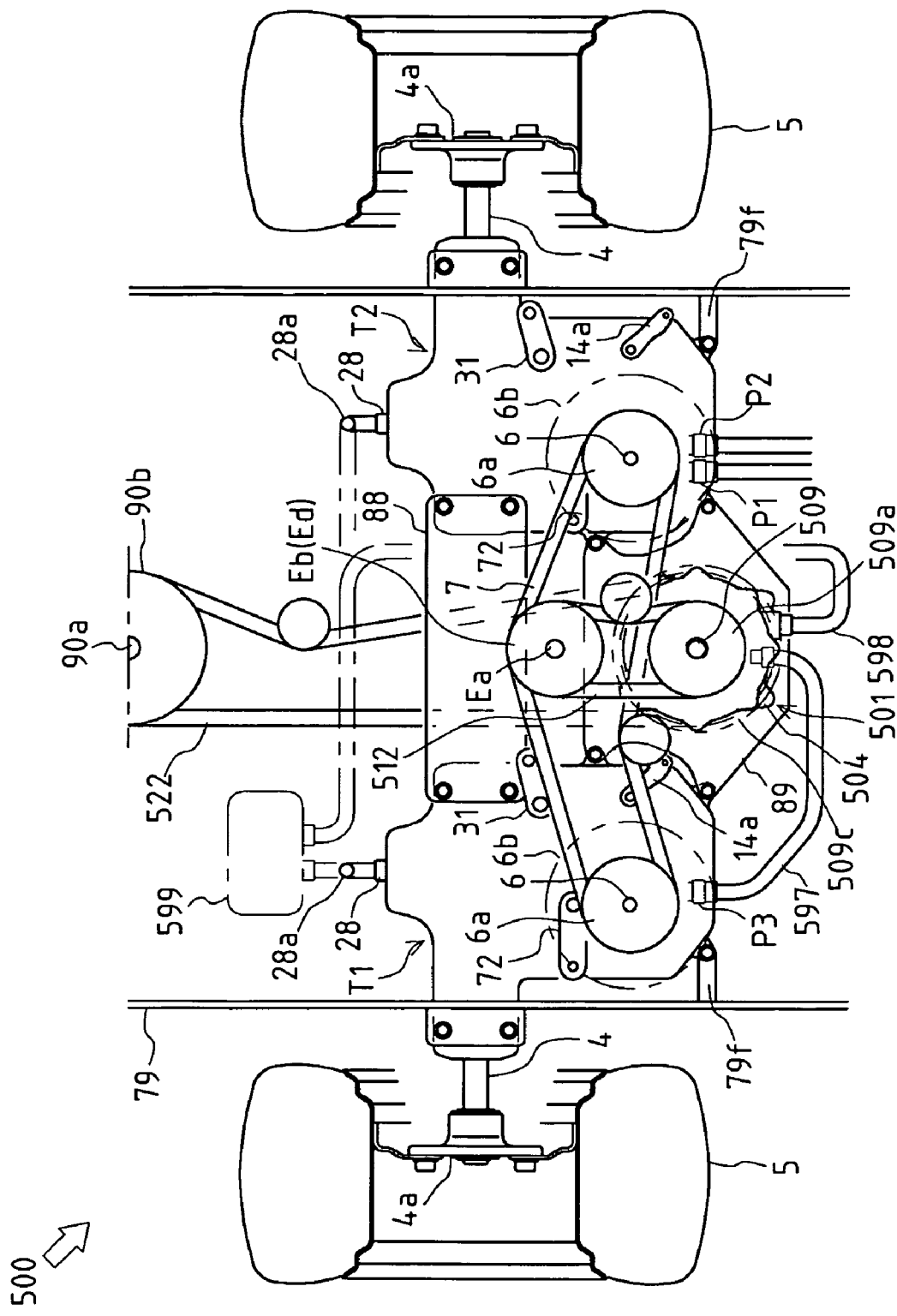
FIG. 22 is a plan view of a power transmission system of a working vehicle according to a fifth embodiment.
Figure 23:
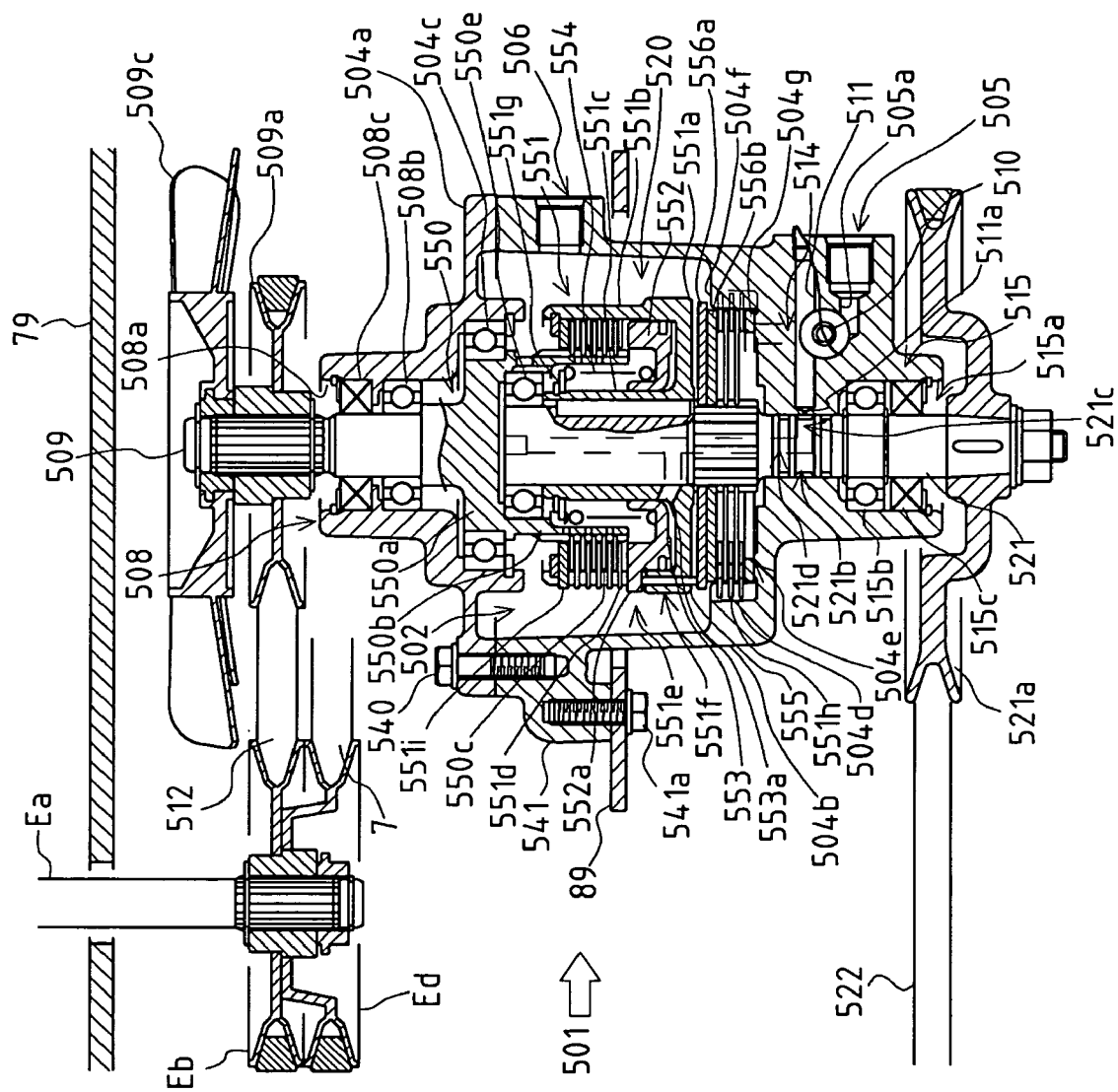
FIG. 23 is a sectional left side view of a working power clutch unit of the working vehicle according to the fifth embodiment.

A working vehicle (riding lawn mower) 500 with a power transmission system including a working power clutch unit 501 according to a fifth embodiment of the invention will be described with reference to FIGS. 22 and 23.

Components and portions in working vehicle 500 which are the same as those in working vehicle 100 are designated by the respective same reference numerals. Further, especially concerning working power clutch unit 501, components and portions designated by 500-marked two-digit reference numerals have the same functions as those designated by the respective 100-marked two-digit reference numerals concerning working power clutch unit 101 in working vehicle 100. Description of these components and portions will be omitted except for special cases.

A distinctive point of the power transmission system including working power clutch unit 501 is to transmit power of engine E to left and right transaxles T1 and T2 without passing working power clutch unit 501. In this regard, engine output shaft Ea of engine E is fixedly provided on the bottom portion thereof with engine output pulley Eb drivingly connected to an input pulley 509a fixed on an input shaft 509 of working power clutch unit 501 through a belt 512, and further, a second output pulley Ed is fixed on the bottom portion of engine output shaft Ea just below engine output pulley Eb, so as to be drivingly connected to input pulleys 6a fixed on input shafts 6 of respective transaxles T1 and T2 through belt 7.

Therefore, in the power transmission system including working power clutch unit 501, only belt 7 is interposed between input shafts 6 of transaxles T1 and T2 and engine output shaft Ea so as to transmit power of engine E to transaxles T1 and T2 reducing a power loss, in comparison with two belts 112 and 7 interposed between input shafts 6 and engine output shaft Ea.

Working power clutch unit 501 is similar to working power clutch unit 101, except that working power clutch 501 includes no relay rotor (such as pulley 109b of working power clutch unit 101) for transmitting power to transaxles T1 and T2. In this regard, only a cooling fan 509c and input pulley 509a are fixed on a top portion of input shaft 509 projecting upward from a housing 504 of working power clutch unit 501. Working power clutch unit 501 does not transmit the rotation of input shaft 509 to transaxles T1 and T2, but transmits it to mower unit 90 through a hydraulic clutch 520 and a PTO shaft 521

Figure 24:
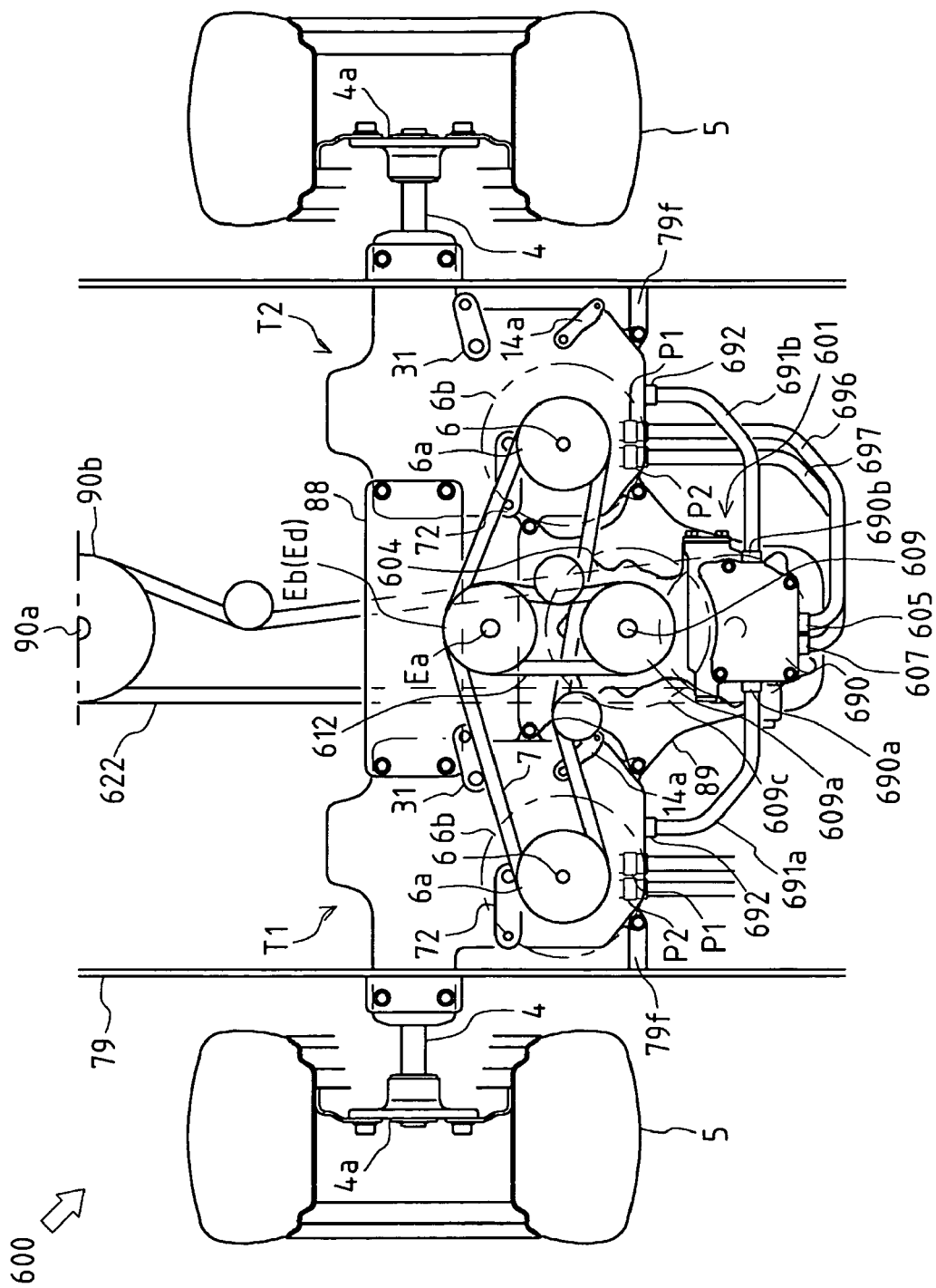
FIG. 24 is a plan view of a power transmission system of a working vehicle according to a sixth embodiment.
Figure 25:
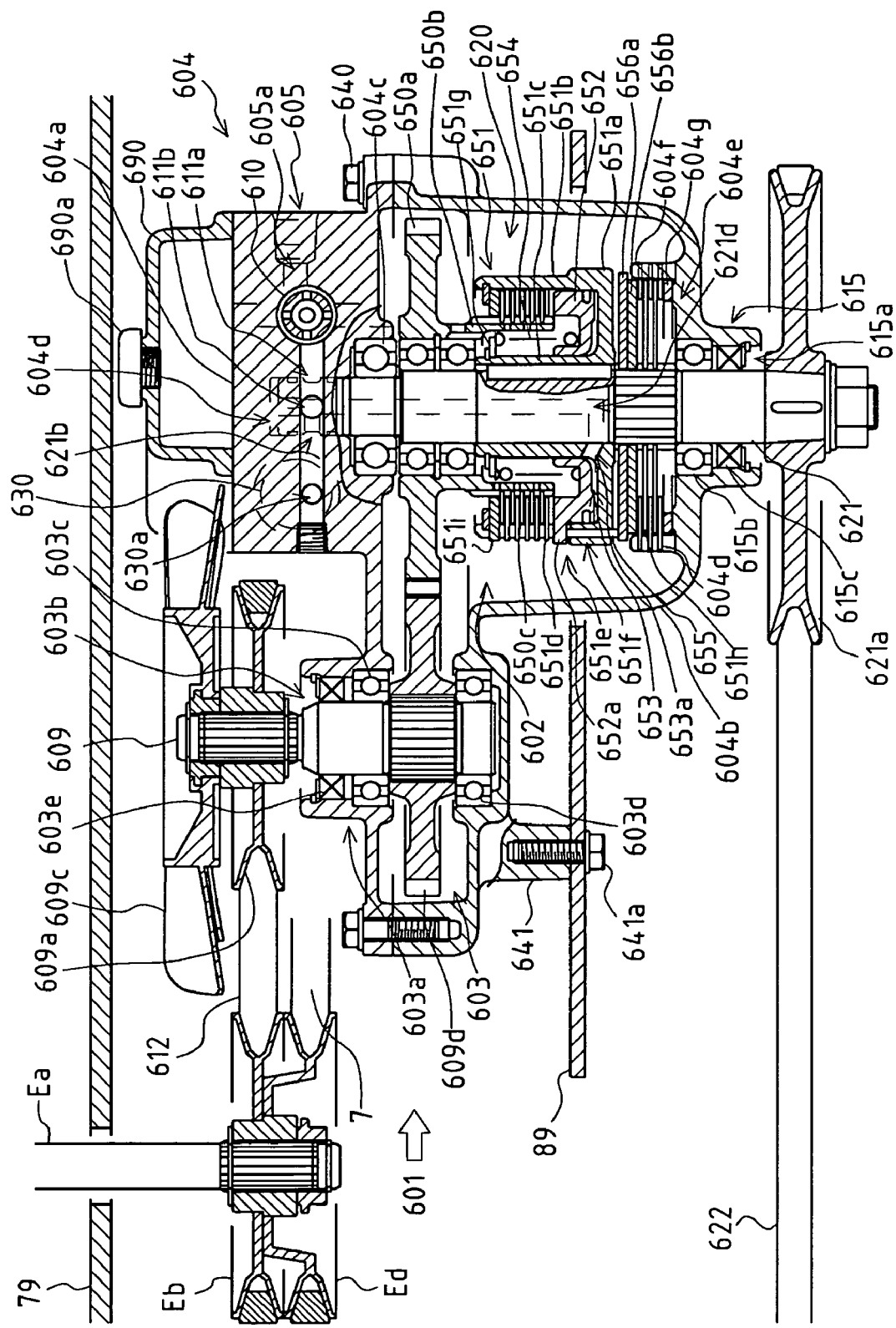
FIG. 25 is a sectional left side view of a working power clutch unit of the working vehicle according to the sixth embodiment.

A working vehicle (riding lawn mower) 600 with a power transmission system including a working power clutch unit 601 according to a sixth embodiment of the invention will be described with reference to FIGS. 24 and 25.

Components and portions in working vehicle 600 which are the same as those in working vehicles 200 and 500 are designated by the respective same reference numerals. Further, especially concerning working power clutch unit 601, components and portions designated by 600-marked two-digit reference numerals have the same functions as those designated by the respective 200-marked or 500-marked two-digit reference numerals concerning to each of working power clutch units 201 and 501 in working vehicles 200 and 500. Description of these components and portions will be omitted except for special cases.

Except for a power train to left and right transaxle T1 and T2 in the power transmission system, working vehicle 600 with the power transmission system including transaxles T1 and T2 and working power clutch unit 601 according to the sixth embodiment is similar to vehicle 200 with the aforesaid power transmission system including transaxles T1 and T2 and working power clutch unit 201 according to the second embodiment as shown in FIGS. 10 and 12 to 15. That is, in working power clutch unit 601, an input shaft 609 and a PTO shaft 621 are axially offset from each other (PTO shaft 621 is disposed behind input shaft 609), and a hydraulic clutch 620 is coaxially provided on PTO shaft 621. A gear 609d fixed on input shaft 609 meshes with a gear 650a formed on an inner clutch rotor 650 serving as a driving side rotor of hydraulic clutch 620, so as to transmit the rotation of input shaft 609 to PTO shaft 621 through engaged hydraulic clutch 620. A hydraulic circuit of working vehicle 600 is the same as that of working vehicle 200 shown in FIG. 11.

In the power transmission system according to the sixth embodiment, the power train to transaxles T1 and T2 comprises belt 7 interposed between second engine output pulley Ed fixed on engine output shaft Ea of engine E and input pulleys 6a fixed on input shafts 6 of transaxles T1 and T2, similar to that of the power transmission system with working power clutch unit 501 according to the fifth embodiment. That is, transaxles T1 and T2 receive power from engine E without passing working power clutch unit 601, and working power clutch unit 601 receives power from engine E through a belt 612 interposed between engine output pulley Eb fixed on engine output shaft Ea and input pulley 609a fixed on input shaft 609.

Figure 26:
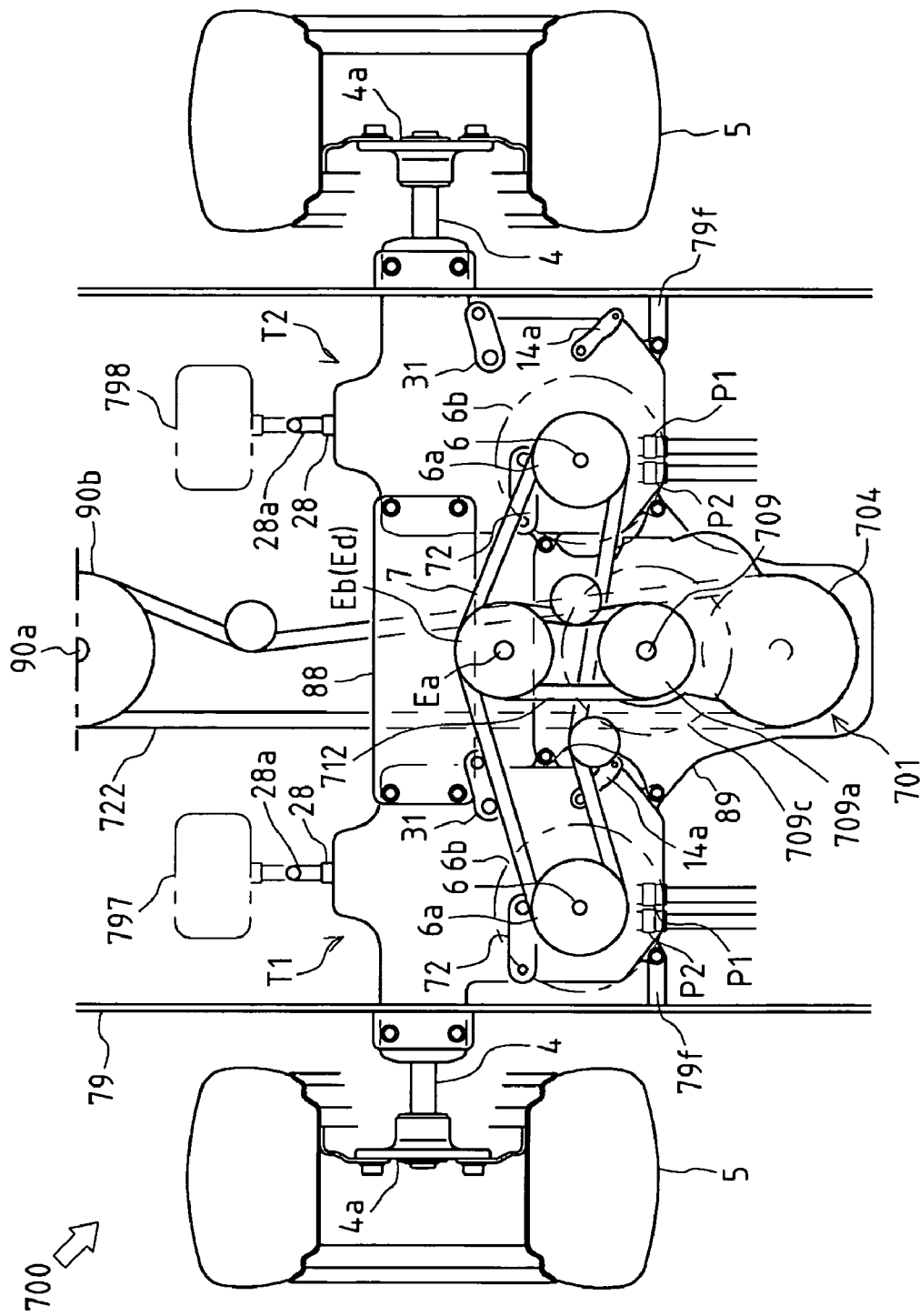
FIG. 26 is a plan view of a power transmission system of a working vehicle according to a seventh embodiment.
Figure 27:
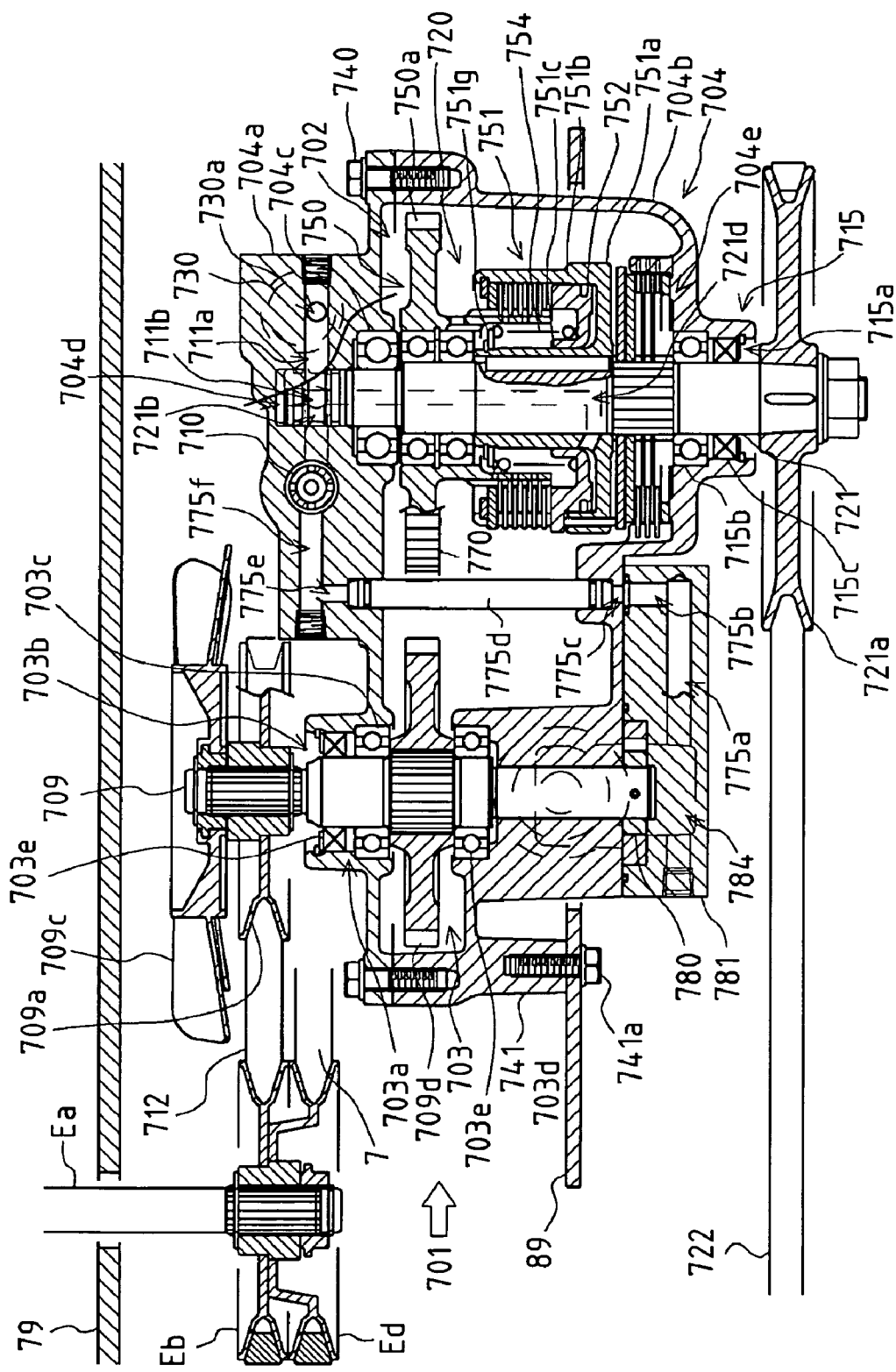
FIG. 27 is a sectional left side view of a working power clutch unit of the working vehicle according to the seventh embodiment.

A working vehicle (riding lawn mower) 700 with a power transmission system including a working power clutch unit 701 according to a seventh embodiment of the invention will be described with reference to FIGS. 26 and 27.

Components and portions in working vehicle 700 which are the same as those in working vehicles 300 and 500 are designated by the respective same reference numerals. Further, especially concerning a working power clutch unit 701, components and portions designated by 700-marked two-digit reference numerals have the same functions as those designated by the respective 300-marked or 500-marked two-digit reference numerals concerning each of working power clutch units 301 and 501 in working vehicles 300 and 500. Description of these components and portions will be omitted except for special cases.

Except for a power train to left and right transaxle T1 and T2 in the power transmission system, working vehicle 700 with the power transmission system including transaxles T1 and T2 and working power clutch unit 701 according to the seventh embodiment is similar to vehicle 300 with the aforesaid power transmission system including transaxles T1 and T2 and working power clutch unit 301 according to the third embodiment as shown in FIGS. 17 to 20. That is, in working power clutch unit 701, an input shaft 709 and a PTO shaft 721 are axially offset from each other (PTO shaft 721 is disposed behind input shaft 709), and a hydraulic clutch 720 is coaxially provided on PTO shaft 721. A gear 709d fixed on input shaft 709 meshes through an idle gear 770 with a gear 750a formed on an inner clutch rotor 750 serving as a driving side rotor of hydraulic clutch 720, so as to transmit the rotation of input shaft 709 to PTO shaft 721 through engaged hydraulic clutch 720. A hydraulic circuit of working vehicle 700 is the same as that of working vehicle 300 shown in FIG. 16.

In the power transmission system according to the seventh embodiment, the power train to transaxles T1 and T2 comprises belt 7 interposed between second engine output pulley Ed fixed on engine output shaft Ea of engine E and input pulleys 6a fixed on input shafts 6 of transaxles T1 and T2, similar to that of the power transmission system with working power clutch unit 501 according to the fifth embodiment. That is, transaxles T1 and T2 receive power from engine E without passing working power clutch unit 701, and working power clutch unit 701 receives power from engine E through a belt 712 interposed between engine output pulley Eb fixed on engine output shaft Ea and input pulley 709a fixed on input shaft 709.

It is further understood by those skilled in the art that the foregoing descriptions are preferred embodiments of the disclosed apparatus and that various changes and modifications may be made in the invention without departing from the scope thereof defined by the following claims.

What is claimed is:

1. A power transmission system for a working vehicle, comprising:
   a vehicle frame;
   a prime mover mounted on the vehicle frame;
   a pair of left and right drive wheels;
   a pair of left and right transaxles juxtaposed on the vehicle frame, wherein each of the left and right transaxles includes a single axle for individually driving each of the left and right drive wheels in forward and rearward directions;
   a working device; and
   a working power clutch unit disposed between the left and right transaxles so as to clutch on/off power transmitted from the prime mover to the working device, the working power clutch unit including:
   a driving side rotary mechanism for receiving power from the prime mover, the driving side rotary mechanism having one or more first rotors interlocking with each other,
   a driven side rotary mechanism for outputting power to the working device, the driven side rotary mechanism having one or more second rotors interlocking with each other, and
   a hydraulic clutch drivingly interposed between the driving side rotary mechanism and the driven side rotary mechanism, and incorporated in the working power clutch unit.

2. The power transmission system according to claim 1, wherein the working power clutch unit is integrally connected to the left and right transaxles.

3. The power transmission system according to claim 2, further comprising:
   a connection frame connecting the left and right transaxles to each other, wherein the working power clutch unit is supported by the connection frame.

4. The power transmission system according to claim 1, wherein the left and right transaxles receive power from the prime mover through the driving side rotary mechanism of the working power clutch unit.

5. The power transmission system according to claim 4, further comprising:
   a belt transmission interposed between the driving side rotary mechanism of the working power clutch unit and the pair of left and right transaxles.

6. The power transmission system according to claim 1, wherein the left and right transaxles receive power from the prime mover, which is not transmitted through the driving side rotary mechanism of the working power clutch unit.

7. The power transmission system according to claim 6, further comprising:
   a belt transmission interposed between the prime mover and the pair of left and right transaxles.

8. The power transmission system according to claim 1, wherein a rotary axis of the foremost first rotor receiving power from the prime mover is not coaxial but parallel to a rotary axis of the last second rotor outputting power to the working device.

9. The power transmission system according to claim 8, wherein the driving side rotary mechanism includes a gear train including gears serving as the first rotors whose rotary axes are not coaxial to each other.

10. The power transmission system according to claim 9, wherein the gear train includes an idle gear.

11. The power transmission system according to claim 1, wherein all of the first rotors and all of the second rotors are coaxial to each other.

12. The power transmission system according to claim 1, further comprising:
    a hydraulic pressure source for the hydraulic clutch, wherein at least one of the left and right transaxles includes the hydraulic pressure source.

13. The power transmission system according to claim 1, further comprising:
    a hydraulic pressure source for the hydraulic clutch, wherein the working power clutch unit includes the hydraulic pressure source.

14. The power transmission system according to claim 1, further comprising:
    a delay valve disposed on a fluid supply passage to the hydraulic clutch so as to moderate the clutching action of the hydraulic clutch.

15. The power transmission system according to claim 1, further comprising:
    a reservoir tank disposed in the working power clutch unit, wherein each of the working power clutch unit and the left and right transaxles includes an individual fluid sump fluidly connected to the reservoir tank.

16. The power transmission system according to claim 1, further comprising:
    a cooling fan which is rotatably integral with the first rotor.

17. The power transmission system according to claim 1, further comprising:
    a transmission interposed between the prime mover and the driving side rotary mechanism.

18. The power transmission system according to claim 1, wherein the prime mover includes an output shaft directly connected to the driving side rotary mechanism.

19. The power transmission system according to claim 1, further comprising:
    a brake mechanism disposed on the downstream side of the hydraulic clutch so as to brake the driven side rotary mechanism when the hydraulic clutch is clutched off.

* * * * *